United States Patent
Ito et al.

(10) Patent No.: US 10,601,339 B2
(45) Date of Patent: Mar. 24, 2020

(54) POWER CONVERSION SYSTEM INCLUDING POWER CONVERSION DEVICES WHICH OPERATE IN PARALLEL, AND POWER CONVERSION DEVICE

(71) Applicant: Panasonic Intellectual Property Management Co., Ltd., Osaka (JP)

(72) Inventors: Tomoki Ito, Hyogo (JP); Yusuke Iwamatsu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/067,611

(22) PCT Filed: Nov. 28, 2016

(86) PCT No.: PCT/JP2016/004971
§ 371 (c)(1),
(2) Date: Jul. 1, 2018

(87) PCT Pub. No.: WO2017/122241
PCT Pub. Date: Jul. 20, 2017

(65) Prior Publication Data
US 2019/0006957 A1    Jan. 3, 2019

(30) Foreign Application Priority Data
Jan. 13, 2016 (JP) .................. 2016-004793

(51) Int. Cl.
*H02M 7/5387* (2007.01)
*H02M 1/12* (2006.01)
(Continued)

(52) U.S. Cl.
CPC .......... *H02M 7/483* (2013.01); *H02M 1/126* (2013.01); *H02M 7/53871* (2013.01); *H02M 2007/4822* (2013.01)

(58) Field of Classification Search
CPC .......... H02M 7/42; H02M 2007/4822; H02M 7/483; H02M 2007/4835; H02M 7/487;
(Continued)

(56) References Cited

U.S. PATENT DOCUMENTS 5,274,542 A * 12/1993 Tanaka .................. H02M 7/487
                                              363/132
6,219,265 B1 * 4/2001 Bernet .................. H02M 7/487
                                              363/137
(Continued)

FOREIGN PATENT DOCUMENTS

EP    0512531 A2    11/1992
EP    2980979 A1    2/2016
(Continued)

OTHER PUBLICATIONS https://patents.google.com/patent/WO2012132127A1/en?oq=WO2012132127 (Year: 2012).*
(Continued)

*Primary Examiner* — Gustavo A Rosario-Benitez
(74) *Attorney, Agent, or Firm* — Renner, Otto, Boissellee & Sklar, LLP

(57) ABSTRACT

A bridge circuit converts input direct-current voltage and outputs alternating-current voltage. A filter circuit attenuates a high-frequency component of the alternating-current voltage output from the bridge circuit. A clamping circuit is disposed between the bridge circuit and the filter circuit, and is capable of short-circuiting the output side of the bridge circuit. A control circuit has a first mode in which a switching element causes the alternating-current voltage to be output to the filter circuit at three or more voltage levels, and a second mode in which the switching element causes the alternating-current voltage to be output to the filter circuit at two voltage levels. When power conversion devices have their alternating-current side output paths (Continued)

connected and operate in parallel, at least one of the power conversion devices operating in parallel operates in the second mode.

9 Claims, 19 Drawing Sheets

(51) Int. Cl.
  *H02M 7/483* (2007.01)
  *H02M 7/48* (2007.01)
(58) Field of Classification Search
  CPC ........ H02M 7/49; H02M 7/493; H02M 7/497; H02M 7/501; H02M 7/515; H02M 7/521; H02M 7/537; H02M 7/5387; H02M 7/48; H02M 7/12; H02M 1/08; H02M 1/32; H02M 1/42; H02M 1/44; H02M 2001/0009; H02M 7/53871; H02M 1/126; H02M 2001/0048
  See application file for complete search history.

(56) References Cited

U.S. PATENT DOCUMENTS

| | | | |
|---|---|---|---|
| 2005/0174817 A1* | 8/2005 | Schmidt | H02M 7/48 363/97 |
| 2012/0155141 A1* | 6/2012 | Esaka | H02J 3/381 363/132 |
| 2014/0376294 A1* | 12/2014 | Hu | H02M 7/487 363/131 |
| 2015/0270789 A1* | 9/2015 | Shi | H02M 3/33569 363/65 |
| 2016/0124400 A1* | 5/2016 | Kanayama | G05B 13/02 307/116 |
| 2016/0329811 A1* | 11/2016 | Du | H02M 3/1584 |
| 2018/0041138 A1* | 2/2018 | Nishikawa | H02M 7/48 |
| 2018/0062531 A1* | 3/2018 | Al-Hokayem | H02M 1/12 |

FOREIGN PATENT DOCUMENTS

| | | | |
|---|---|---|---|
| EP | 3029821 A1 | 6/2016 | |
| JP | 4-334976 | 11/1992 | |
| JP | 2011-229215 A | 11/2011 | |
| JP | 2012-205390 | 10/2012 | |
| WO | WO-2012132127 A1 * | 10/2012 | ............... H02J 3/32 |
| WO | 2014/157700 A1 | 10/2014 | |
| WO | WO-2014156003 A1 * | 10/2014 | .......... H02M 7/5387 |
| WO | 2015/015721 A | 2/2015 | |

OTHER PUBLICATIONS

International Search Report (ISR) dated Dec. 20, 2016 in International (PCT) Application No. PCT/JP2016/004971.
Extended European Search Report dated Feb. 5, 2019 for corresponding European patent application No. 16884845.5.

* cited by examiner

FIG. 11

| OPERATING MODE LIST TABLE | |
|---|---|
| FIRST POWER CONVERSION DEVICE | FIRST OPERATING MODE |
| SECOND POWER CONVERSION DEVICE | SECOND OPERATING MODE |
| THIRD POWER CONVERSION DEVICE | FIRST OPERATING MODE |
| ⋮ | ⋮ |
| TOTAL CAPACITANCE OR NUMBER OF POWER CONVERSION DEVICES THAT ARE TURNED ON | VA VALUE OR # OF DEVICES |
| PROPORTION OF POWER CONVERSION DEVICES OPERATING IN SECOND OPERATING MODE | % VALUE |

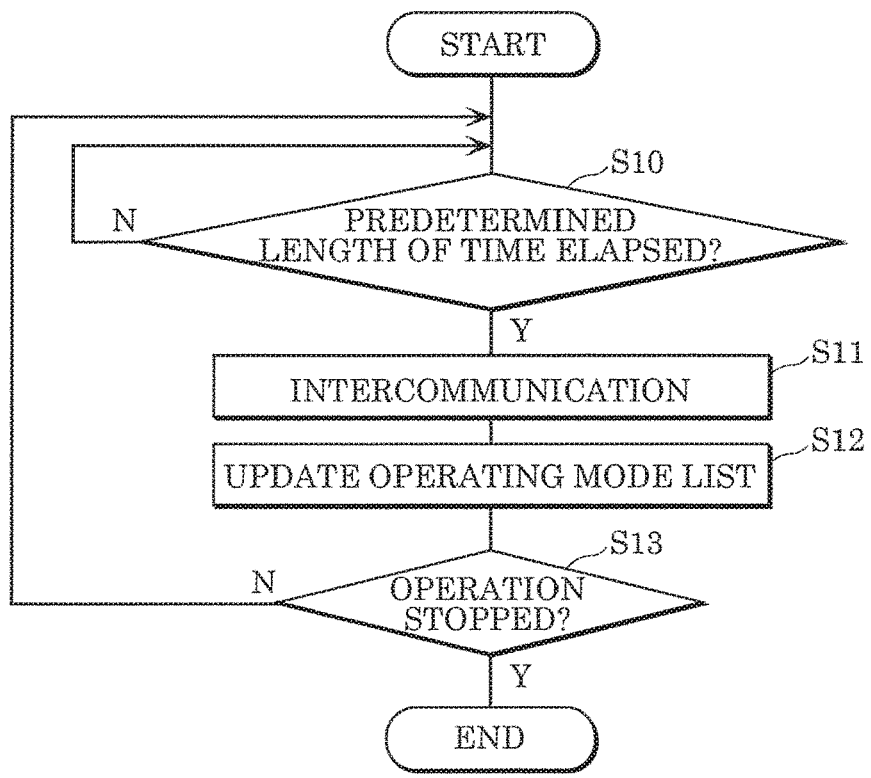

POWER CONVERSION SYSTEM INCLUDING POWER CONVERSION DEVICES WHICH OPERATE IN PARALLEL, AND POWER CONVERSION DEVICE

TECHNICAL FIELD

The present invention relates to a power conversion system and a power conversion device that convert direct-current power into alternating-current power.

BACKGROUND ART

The majority of power conversion devices that convert direct-current power into alternating-current power employ an inverter circuit including a bridge circuit. In the bridge circuit, between a high-side reference line and a low-side reference line which are connected to the direct-current power supply, two pairs (arms) of switching elements connected in series are connected in parallel. Among the four switching elements included in the two arms, a group including a first switching element and a fourth switching element and a group including a second switching element and a third switching element operate complementarily. With this configuration, the high-side reference potential and the low-side reference potential are alternately output at adjusted times. A signal defined by these two levels passes through a subsequent filter circuit to generate alternating-current voltage having a sine wave. Hereinafter, in the present specification, this control method is referred to as a "bipolar PWM" method.

A circuit configuration in which a clamping circuit is disposed between a bridge circuit and a filter circuit has been proposed (for example, see Patent Literature (PTL) 1). With this circuit configuration, it is possible to insert a period in which output at both terminals of the bridge circuit is short-circuited by the clamping circuit. Accordingly, three levels—high-side reference potential, zero potential, and low-side reference potential—can be output to the filter circuit. In the positive region of the sine wave, a signal defined by two levels consisting of the high-side reference potential and the zero potential is output, and in the negative region of the sine wave, a signal defined by two levels consisting of the zero potential and the low-side reference potential is output. A signal defined by these three levels passes through the subsequent filter circuit to generate alternating-current voltage having a sine wave. Hereinafter, in the present specification, this control method is referred to as a "clamping" method.

Compared to the bipolar PWM method, with the clamping method, the amplitude of the power output to the filter circuit can be cut in half, making it possible to reduce loss and achieve high-efficiency power conversion.

Recent years have seen an increase in systems including power conversion devices that are connected and operate in parallel and convert direct-current power supplied from a direct-current power supply such as a solar cell, fuel cell, or battery, into alternating-current power (i.e., power conditioners).

CITATION LIST

Patent Literature

PTL 1: International Publication No. 2014/157700

SUMMARY OF THE INVENTION

Technical Problem

When supplying alternating-current power to a load cut off from a utility power grid (hereinafter "grid") from a plurality of power conversion devices connected in parallel, if the plurality of power conversion devices are driven using the clamping method, distortion of the output voltage in the zero-crossover period increases due to dead-time. This negatively influences the load when it detects the zero-crossover and undergoes synchronization control. In particular, the more units there are operating in parallel, the bigger the output load is, and the bigger the zero-crossover distortion is.

The present invention has been conceived in view of this, and has an object to provide a power conversion system and power conversion device capable of inhibiting zero-crossover distortion and performing high-efficiency power conversion when operating in parallel.

Solution to Problem

In order to overcome the above-described problem, a power conversion system according to the present invention includes a plurality of power conversion devices whose alternating-current side output paths are connected and that operate in parallel. Each of the plurality of power conversion devices includes: a bridge circuit capable of converting input direct-current voltage and outputting alternating-current voltage; a filter circuit that attenuates a high-frequency component of the alternating-current voltage output by the bridge circuit; and a clamping circuit disposed between the bridge circuit and the filter circuit, and capable of short-circuiting an output side of the bridge circuit. Among the plurality of power conversion devices, the bridge circuit and the clamping circuit included in at least one power conversion device operate in a first mode in which the alternating-current voltage is output to the filter circuit at three or more voltage levels, and the bridge circuit and the clamping circuit included in each remaining power conversion device operate in a second mode in which the alternating-current voltage is output to the filter circuit at two voltage levels.

Note that variations achieved by selectively combining the above elements are valid aspects of the present invention. Moreover, language may be changed so as to change the subject matter to and from a method, device, system etc. Such variations are also valid aspects of the present invention

Advantageous Effects of Invention

The present invention makes it possible to realize a power conversion system and power conversion device that inhibit zero-crossover distortion and perform high-efficiency power conversion when operating in parallel.

BRIEF DESCRIPTION OF DRAWINGS

FIG. 11 illustrates one example of an operating mode list table stored in the switching determination unit illustrated in FIG. 10.

FIG. 12 is a flow chart of basic operations performed by the switching determination unit illustrated in FIG. 10.

DESCRIPTION OF EXEMPLARY EMBODIMENTS

Figure 1:
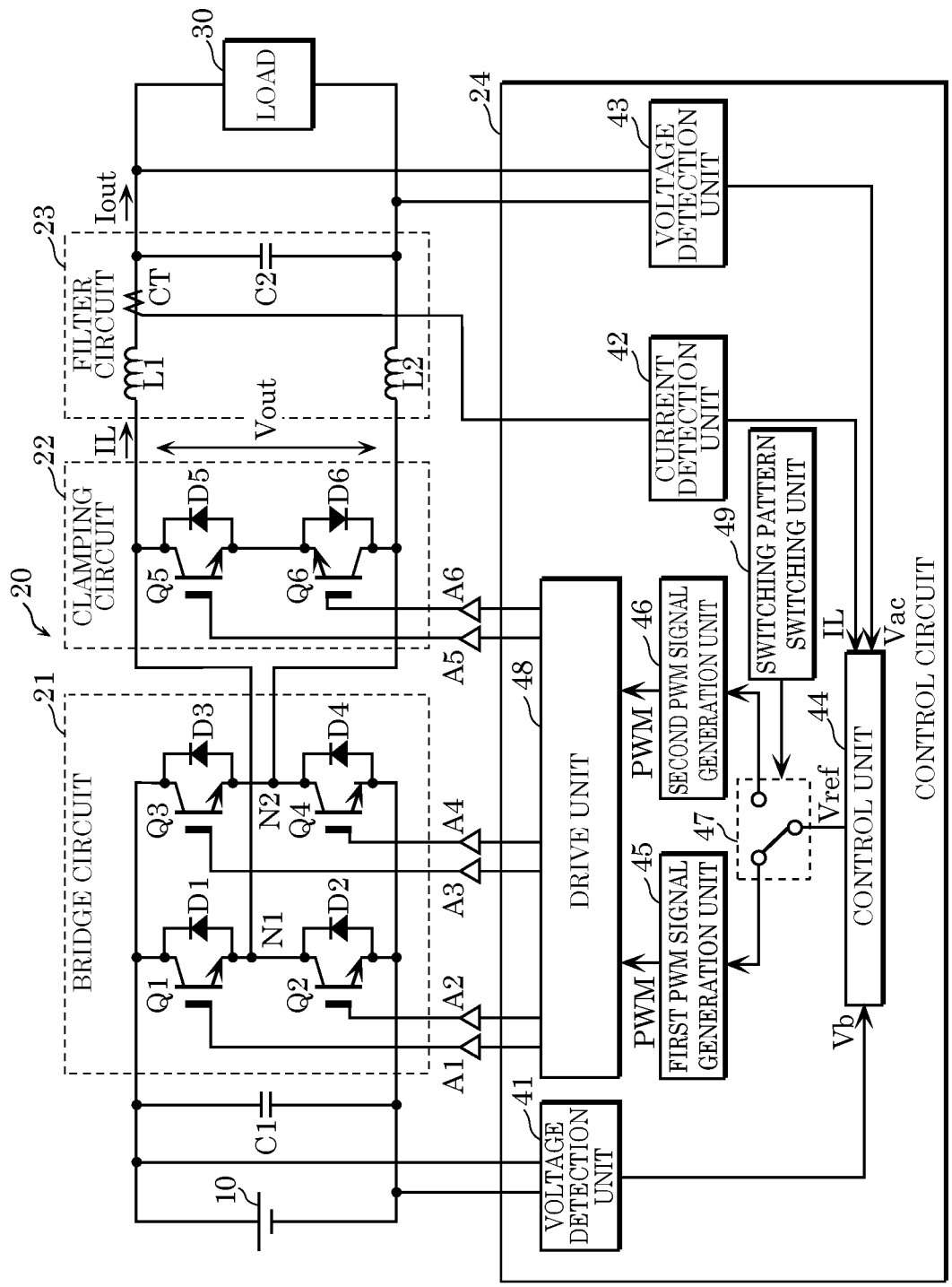
FIG. 1 illustrates a configuration of a power conversion device used in an embodiment.

FIG. 1 illustrates a configuration of power conversion device 20 used in an embodiment. Power conversion device 20 converts direct-current power supplied from direct-current power supply 10 into alternating-current power and outputs the converted alternating-current power to load 30. Direct-current power supply 10 is, for example, a solar cell or fuel cell. In such cases, power conversion device 20 functions as a power conditioner that converts direct-current power generated by the solar cell or fuel cell into alternating-current power. Note that direct-current power supply 10 may be a battery. In such cases, power conversion device 20 functions as a bi-directional power conditioner. Although a power grid is not illustrated in FIG. 1, power conversion device 20 may have a configuration that is connectable to a grid, by including a relay (not illustrated) on the alternating-current output path and switching the relay to the grid side. Power conversion device 20 may be power supply completely independent from the power grid.

First capacitor C1 in power conversion device 20 smoothes the voltage from direct-current power supply 10. Bridge circuit 21 functions as an inverter circuit that converts direct-current power supplied from direct-current power supply 10 into alternating-current power. Bridge circuit 21 includes a first arm including first switching element Q1 and second switching element Q2 connected in series, a second arm including third switching element Q3 and fourth switching element Q4 connected in series. The first arm and the second arm are connected to direct-current power supply 10 in parallel.

For example, insulated gate bipolar transistors (IGBT) can be used for first switching element Q1 through fourth switching element Q4. First freewheeling diode D1 through fourth freewheeling diode D4 are respectively connected in parallel and oriented in opposite directions to first switching element Q1 through fourth switching element Q4. Note that metal-oxide-semiconductor field-effect transistors (MOSFETs) may be used for first switching element Q1 through fourth switching element Q4. In such cases, parasitic diodes formed in a direction from the source to the drain can be used for first freewheeling diode D1 through fourth freewheeling diode D4.

Bridge circuit 21 having the configuration described above converts direct-current voltage input from direct-current power supply 10 into alternating-current voltage defined by a combination of two voltage levels (positive reference voltage +Vb and negative reference voltage −Vb), and outputs the converted alternating-current voltage from midpoint N1 of the first arm and midpoint N2 of the second arm.

Clamping circuit 22 is disposed between bridge circuit 21 and filter circuit 23, and is capable of short-circuiting output terminals (N1, N2) of bridge circuit 21, and capable of switching the direction of conduction when short-circuiting. Clamping circuit 22 includes fifth switching element Q5 and sixth switching element Q6 connected in series and oriented in opposite directions. Fifth switching element Q5 and sixth switching element Q6 connected in series are connected between output terminals (N1, N2) of bridge circuit 21.

In the example illustrated in FIG. 1, IGBTs are used for fifth switching element Q5 and sixth switching element Q6. The collector terminal of fifth switching element Q5 is connected to a first output line of bridge circuit 21, and the collector terminal of sixth switching element Q6 is connected to a second output line of bridge circuit 21. The emitter terminals of fifth switching element Q5 and sixth switching element Q6 are connected together. Fifth freewheeling diode D5 is connected in parallel to fifth switching element Q5, in an orientation such that current flows from the emitter to the collector, and sixth freewheeling diode D6 is connected in parallel to sixth switching element Q6, in an orientation such that current flows from the emitter to the collector.

Note that when MOSFETs are used for fifth switching element Q5 and sixth switching element Q6, parasitic diodes formed in a direction from the source to the drain can be used for fifth freewheeling diode D5 and sixth freewheeling diode D6. Although fifth switching element Q5 and sixth switching element Q6 are disposed oriented such that their emitter terminals are connected in the example illustrated in FIG. 1, fifth switching element Q5 and sixth switching element Q6 may be disposed oriented such that their collector terminals are connected.

Filter circuit 23 includes first reactor L1, second reactor L2, and second capacitor C2. Filter circuit 23 attenuates a harmonic component of the output voltage and output current from bridge circuit 21 that passes through clamping circuit 22, and approximates the output voltage and output current from bridge circuit 21 to a sine wave. Alternating-current power output from filter circuit 23 is supplied to load 30.

Control circuit 24 controls first switching element Q1 through sixth switching element Q6 included in bridge circuit 21 and clamping circuit 22, and drives power conversion device 20. Control circuit 24 includes voltage detection unit 41, current detection unit 42, voltage detection unit 43, control unit 44, first PWM signal generation unit 45, second PWM signal generation unit 46, switch unit 47, drive unit 48, and switching pattern switching unit 49. Control circuit 24 can be implemented as hardware and software resources working in cooperation, and can be implemented as hardware resources only. Analog elements, microcomputers, DSP, ROM, RAM, FPGA, and other LSI circuits can be used as hardware resources. Programs such as firmware can be used as software resources.

Control circuit 24 supports a first operating mode and a second operating mode. In the first operating mode, control circuit 24 controls first switching element Q1 through sixth switching element Q6 so as to output three voltage levels to filter circuit 23, and in the second operating mode, control circuit 24 controls first switching element Q1 through sixth switching element Q6 so as to output two voltage levels to filter circuit 23. The first operating mode corresponds to the clamping method described above, and the second operating mode corresponds to the bipolar PWM method described above.

Voltage detection unit 41 detects, and outputs to control unit 44, input voltage (direct-current bus voltage value Vb) from bridge circuit 21. Current detection unit 42 detects, using current sensor CT, and outputs, to control unit 44, alternating current (reactor current value IL) flowing from first reactor L1. Voltage detection unit 43 detects, and outputs to control unit 44, alternating-current voltage value Vac after passing through filter circuit 23.

Control unit 44 generates voltage command value Vref based on target current value Iref, reactor current value IL, current bus voltage value Vb, and alternating-current voltage Vac. The method for generating voltage command value Vref will be described in detail later.

First PWM signal generation unit 45 generates a PWM signal to be used in the first operating mode, based on voltage command value Vref supplied from control unit 44 and a carrier wave for the first operating mode. Second PWM signal generation unit 46 generates a PWM signal to be used in the second operating mode, based on voltage command value Vref supplied from control unit 44 and a carrier wave for the second operating mode. First PWM signal generation unit 45 and second PWM signal generation unit 46 each include a comparator that compares voltage command value Vref and the carrier wave, and the comparator outputs either a high-level signal or a low-level signal depending on the comparison result.

Two carrier waves are used for the first operating mode: a first carrier wave used in the positive half cycle of voltage command value Vref; and a second carrier wave used in the negative half cycle of voltage command value Vref. The first carrier wave and the second carrier wave have a waveform defined by two triangular waves symmetrical about the zero line of voltage command value Vref. The carrier wave for the second operating mode has a waveform defined by a single triangular wave. Note that the amplitude of the carrier waves for the first operating mode is half the amplitude of the carrier wave for the second operating mode.

Switch unit 47 is a c-contact switch that switches between outputting voltage command value Vref input from control unit 44 to either first PWM signal generation unit 45 or second PWM signal generation unit 46, based on a control signal from switching pattern switching unit 49.

Based on a PWM signal supplied from either first PWM signal generation unit 45 or second PWM signal generation unit 46, drive unit 48 generates drive signals that are supplied to the gate terminals of first switching element Q1 through sixth switching element Q6. The voltages of the drive signals for first switching element Q1 through sixth switching element Q6 are amplified by first amplifier A1 through sixth amplifier A6, respectively, and the amplified drive signals are applied to the gate terminals of first switching element Q1 through sixth switching element Q6.

Figure 2:
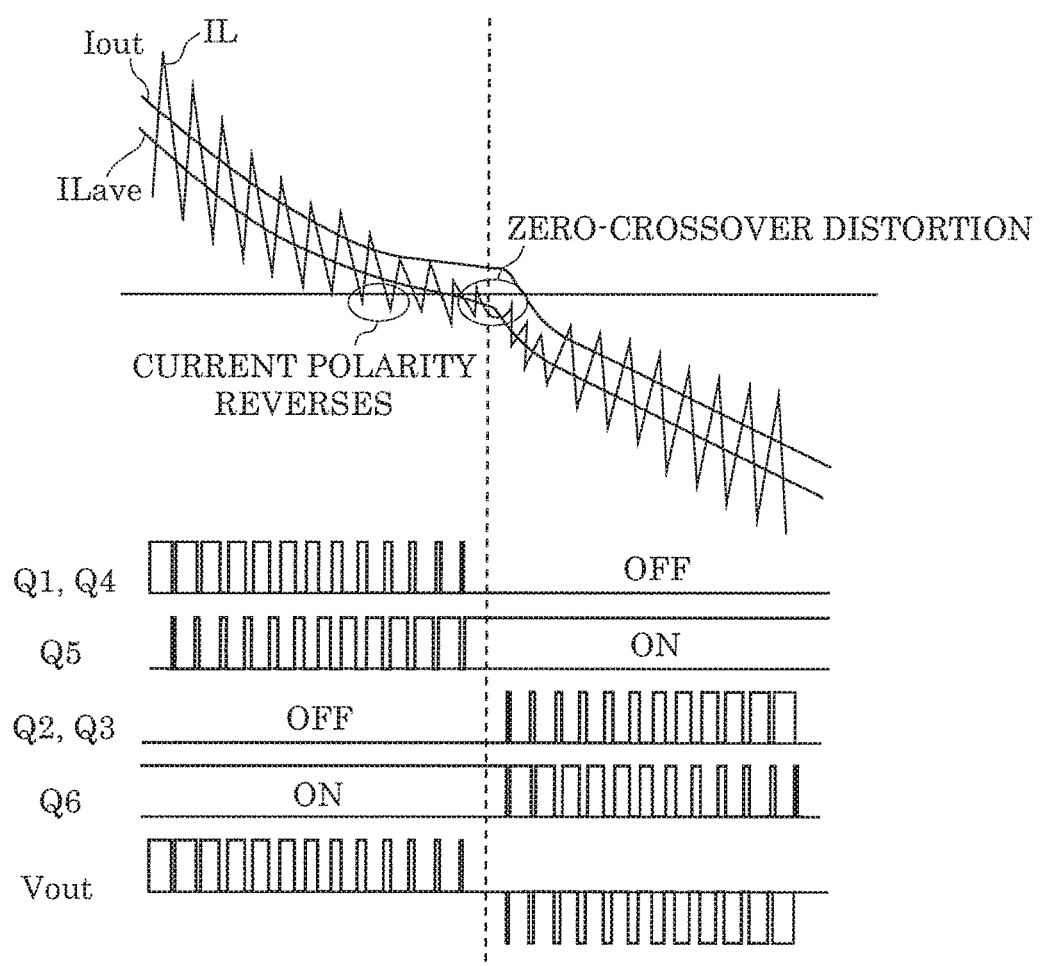
FIG. 2 illustrates, in a first operating mode: drive signals for a first switching element through a sixth switching element; and output voltage value Vout, reactor current value IL, average current value ILave of reactor current value IL, and output current value Iout from an inverter circuit.

FIG. 2 illustrates, in the first operating mode: the drive signals for first switching element Q1 through sixth switching element Q6; and output voltage value Vout, reactor current value IL, average current value ILave of reactor current value IL, and output current value Iout from the inverter circuit. A ripple is superimposed on reactor current value IL, and reactor current value IL is smoothed by filter circuit 23.

When voltage command value Vref is positive in the first operating mode, drive unit 48 generates, based on the PWM signal for the first operating mode, drive signals for switching second switching element Q2 and third switching element Q3 off, and a drive signal for switching sixth switching element Q6 on. Moreover, based on the PWM signal for the first operating mode, drive unit 48 generates drive signals that complementarily switch (i) first switching element Q1 and fourth switching element Q4 and (ii) fifth switching element Q5 on and off.

When voltage command value Vref is negative in the first operating mode, drive unit 48 generates, based on the PWM signal for the first operating mode, drive signals for switching first switching element Q1 and fourth switching element Q4 off, and a drive signal for switching fifth switching element Q5 on. Moreover, based on the PWM signal for the first operating mode, drive unit 48 generates drive signals that complementarily switch (i) second switching element Q2 and third switching element Q3 and (ii) sixth switching element Q6 on and off.

Figure 3:
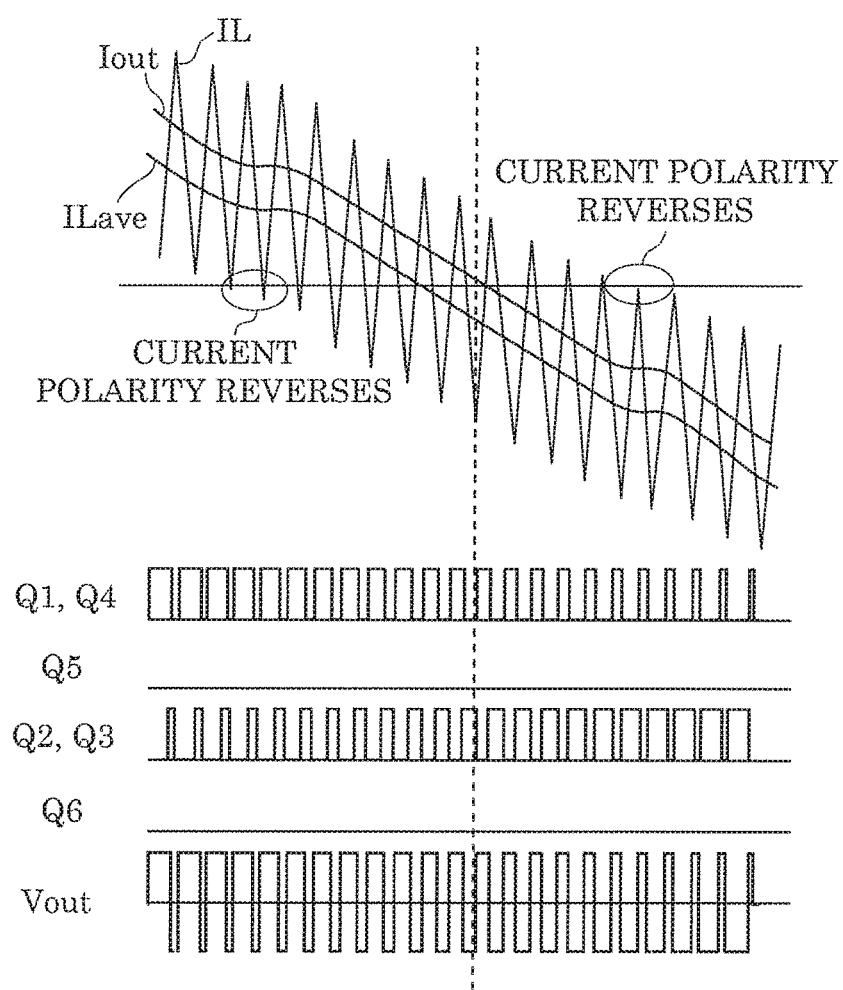
FIG. 3 illustrates, in a second operating mode: drive signals for a first switching element through a sixth switching element; and output voltage value Vout, reactor current value IL, average current value ILave of reactor current value IL, and output current value Iout from an inverter circuit.

FIG. 3 illustrates, in the second operating mode: the drive signals for first switching element Q1 through sixth switching element Q6; and output voltage value Vout, reactor current value IL, average current value ILave of reactor current value IL, and output current value Iout from the inverter circuit.

In the second operating mode, drive unit 48 generates, based on the PWM signal for the second operating mode, drive signals for switching fifth switching element Q5 and sixth switching element Q6 off. Moreover, based on the PWM signal for the second operating mode, drive unit 48 generates drive signals that complementarily switch (i) first switching element Q1 and fourth switching element Q4 and (ii) second switching element Q2 and third switching element Q3 on and off.

Comparing the clamping method illustrated in FIG. 2 and the bipolar PWM method illustrated in FIG. 3 reveals that the clamping method results in zero-crossover distortion due to a "control dead band" resulting from dead-time, but the bipolar PWM method does not result in zero-crossover distortion. Moreover, compared to the clamping method, with the bipolar PWM method, the polarity of reactor current value IL reverses at a point in time farther away from the zero-crossover point. This is because the bipolar PWM method has a larger current ripple.

Figure 4A:
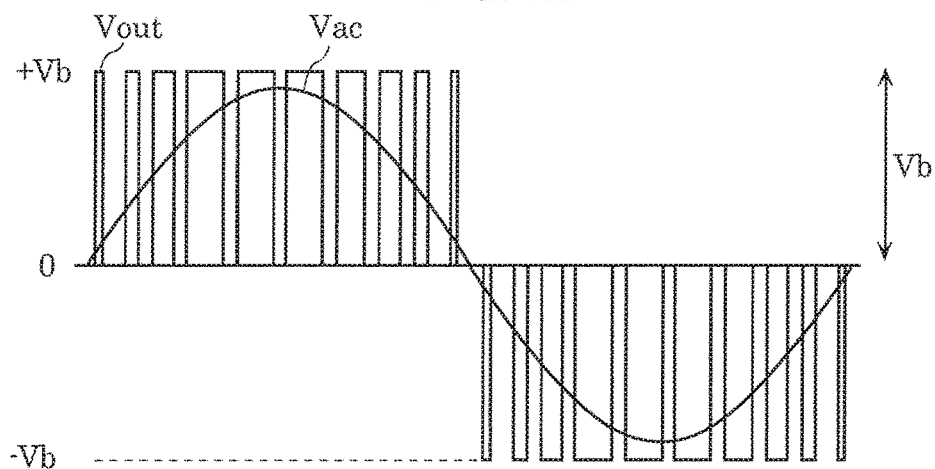
FIG. 4A illustrates output voltage value Vout from an inverter circuit in the first operating mode.
Figure 4B:
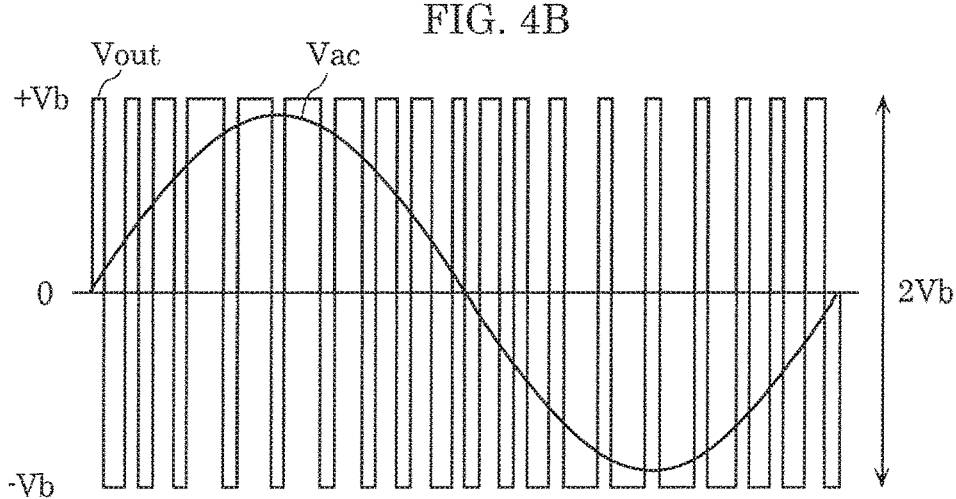
FIG. 4B illustrates output voltage value Vout from an inverter circuit in the second operating mode.

FIG. 4A illustrates output voltage value Vout from the inverter circuit in the first operating mode. FIG. 4B illustrates output voltage value Vout from the inverter circuit in the second operating mode. With the clamping method corresponding to the first operating mode, the amplitude of output voltage value Vout is the same as the amplitude of the voltage from direct-current power supply 10, but with the bipolar PWM method corresponding to the second operating mode, the amplitude of output voltage value Vout is double the amplitude of the voltage from direct-current power supply 10. Accordingly, with the clamping method, the voltage applied to filter circuit 23 is half the voltage applied with the bipolar PWM method, which reduces loss.

Figure 5:
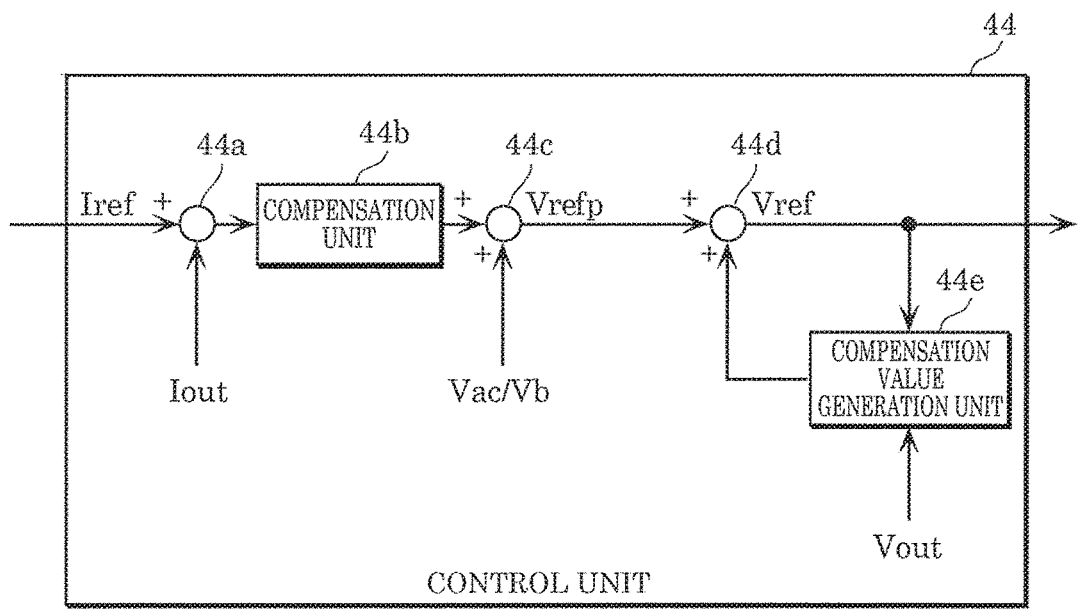
FIG. 5 illustrates a configuration example of a control unit including a function of compensating for dead-time error voltage.

FIG. 5 illustrates a configuration example of control unit 44 including a function of compensating for dead-time error voltage. Control unit 44 includes subtracting unit 44a, compensation unit 44b, first adding unit 44c, second adding unit 44d, and compensation value generation unit 44e.

Subtracting unit 44a subtracts output current value Tout calculated from reactor current value IL detected by current detection unit 42 from target current value Iref. Compensation unit 44b generates voltage command value Vrefp, which is the value before dead-time error voltage compensation is performed, by performing PI compensation or P compensation based on the deviation between target current value Iref and output current value Tout. First adding unit 44c compensates for noise components by adding, to voltage command value Vrefp, a voltage calculated by dividing alternating-current voltage value Vac detected by voltage detection unit 43 by bus voltage value Vb detected by voltage detection unit 41.

Second adding unit 44d generates voltage command value Vref, which is a value after dead-time error compensation has been performed, by adding, to voltage command value Vrefp, which is a value before dead-time error voltage compensation is performed and that has been compensated for noise components, a dead-time error compensation value supplied from compensation value generation unit 44e. Voltage command value Vref is output to first PWM signal generation unit 45 or second PWM signal generation unit 46 via switch unit 47 as well as to compensation value generation unit 44e in control unit 44.

Compensation value generation unit 44e generates, based on voltage command value Vref input from second adding unit 44d and output voltage value Vout, a dead-time error compensation value for compensating for dead-time error voltage. A separate voltage detection unit (not illustrated in the drawings) may be provided before filter circuit 23 to detect output voltage value Vout. Alternatively, output voltage value Vout may be calculated based on alternating-current voltage value Vac detected by voltage detection unit 43 and constants of reactor current value IL and first reactor L1 detected by current detection unit 42.

The compensation method for the dead-time error voltage illustrated in FIG. 5 falls into the voltage method category. In regard to this point, a current method may be used that detects the polarity of the current from the phase of output current value Iout to determine the dead-time error compensation value.

Figure 6:
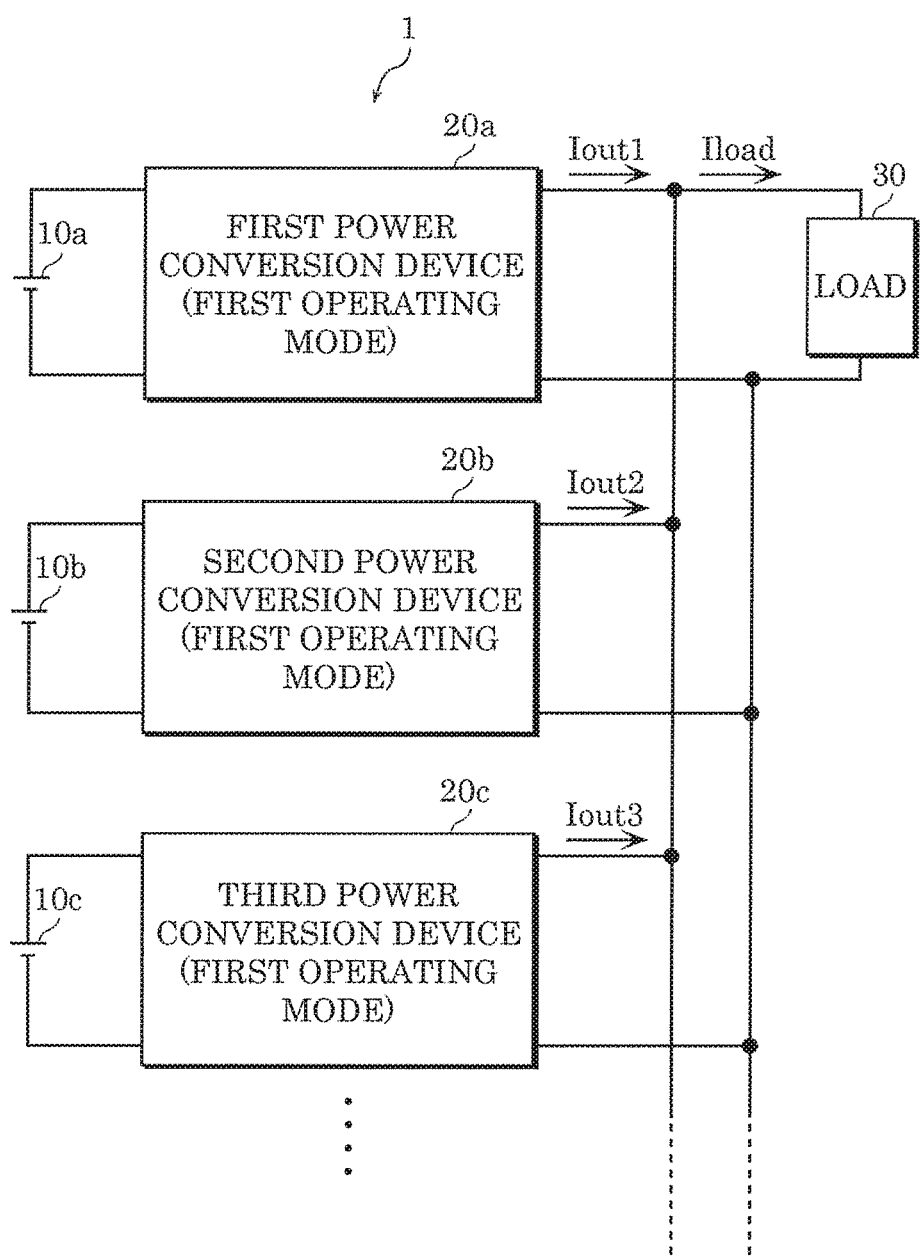
FIG. 6 illustrates a configuration of a power conversion system according to a comparative example.

FIG. 6 illustrates a configuration of power conversion system 1 according to a comparative example. Power conversion system 1 includes a plurality of power conversion devices 20 illustrated in FIG. 1. The output paths on the alternating-current sides of the plurality of power conversion devices 20 are connected such that the plurality of power conversion devices 20 operate in parallel. In other words, a composite of output currents Iout1, Iout2, Iout3 . . . of respective plurality of power conversion devices 20a, 20b, 20c . . . is supplied to load 30 as load current Iload. If all of the plurality of power conversion devices 20a, 20b, 20c . . . are operated in the first operating mode, power conversion efficiency can be maximized.

Figure 7A:
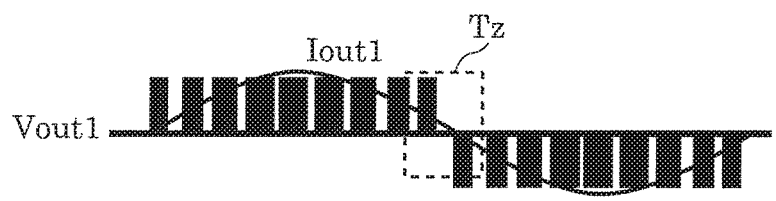
FIG. 7A illustrates waveforms of output voltage value Vout1 and output current value Iout1 from the first power conversion device illustrated in FIG. 6.
Figure 7B:
FIG. 7B illustrates waveforms of output voltage value Vout2 and output current value Iout2 from the second power conversion device illustrated in FIG. 6.
Figure 7C:
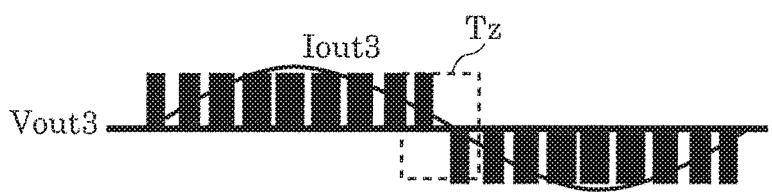
FIG. 7C illustrates waveforms of output voltage value Vout3 and output current value Iout3 from the third power conversion device illustrated in FIG. 6.

FIG. 7A illustrates waveforms of output voltage value Vout1 and output current value Iout1 from first power conversion device 20a illustrated in FIG. 6. FIG. 7B illustrates waveforms of output voltage value Vout2 and output current value Iout2 from second power conversion device 20b illustrated in FIG. 6. FIG. 7C illustrates waveforms of output voltage value Vout3 and output current value Iout3 from third power conversion device 20c illustrated in FIG. 6. With the clamping method, in the zero-crossover period Tz, the polarity of output voltage value Vout1-Vout3 defined by three levels reverses. Accordingly, distortion is prevalent in this zero-crossover period Tz.

Since there is no grid voltage to act as a reference when power conversion system 1 is independent from the power grid, it is not possible to determine with certainty the location at which the zero line will be crossed based on grid voltage. As described above, in the vicinity of the zero-crossover point, distortion is prevalent in the output voltage of power conversion device 20 driven via the clamping method. Accordingly, measuring the zero-crossover point based on this output voltage often results in error.

Figure 8:
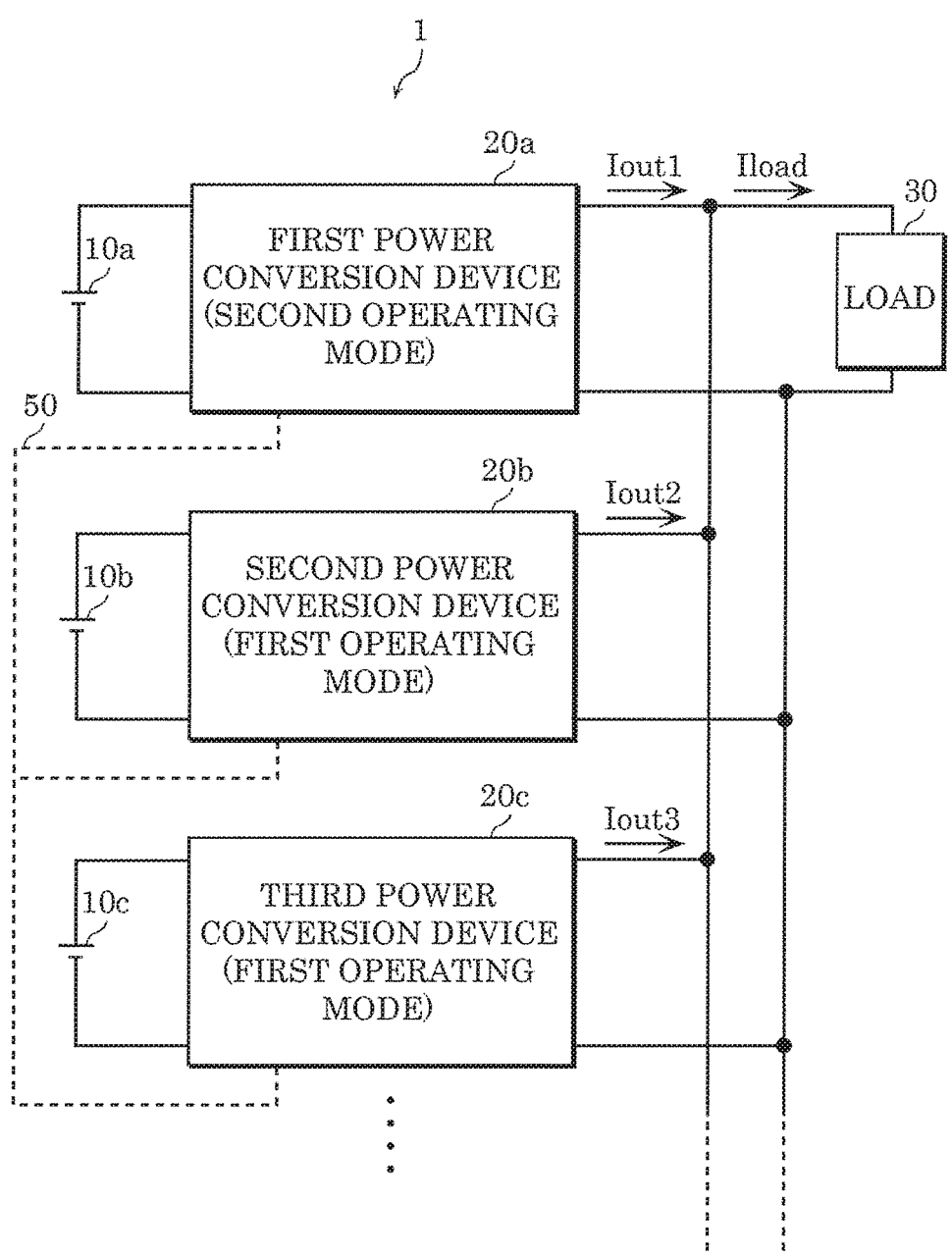
FIG. 8 illustrates a configuration of a power conversion system according to Embodiment 1.

FIG. 8 illustrates a configuration of power conversion system 1 according to Embodiment 1. The plurality of power conversion devices 20a, 20b, 20c . . . are connected in the same manner as in the comparative example illustrated in FIG. 6. In Embodiment 1, the plurality of power conversion devices 20a, 20b, 20c . . . are operated in parallel so that one power conversion device 20 operates in the first operating mode and another power conversion device 20 operates in the second operating mode. In other words, among the plurality of power conversion devices 20a, 20b, 20c . . . at least one power conversion device 20 is operated in the second operating mode.

In the example illustrated in FIG. 8, first power conversion device 20a is operated in the second operating mode and second power conversion device 20b and third power conversion device 20c are operated in the first operating mode. The greater number of power conversion devices 20 that are operated in the second operating mode there are, the less zero-crossover distortion there is, but conversion efficiency also decreases. On the other hand, the fewer number of power conversion devices 20 that are operated in the second operating mode there are, the more zero-crossover distortion there is, but conversion efficiency increases. In this way, there is a trade-off relationship between reduction of zero-crossover distortion and conversion efficiency. The designer determines the number of power conversion devices 20 to operate in the second operating mode based on, for example, test or simulation results and the application of load 30.

Figure 9A:
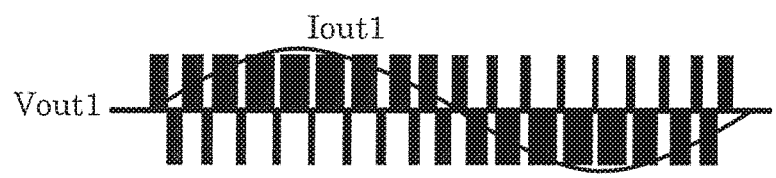
FIG. 9A illustrates waveforms of output voltage value Vout1 and output current value Iout1 from the first power conversion device illustrated in FIG. 8.
Figure 9B:
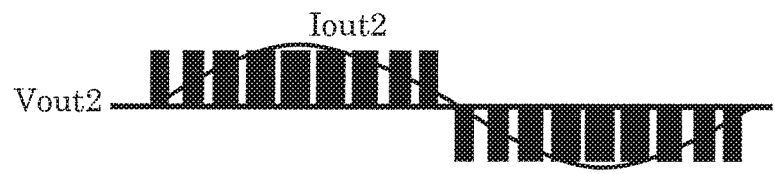
FIG. 9B illustrates waveforms of output voltage value Vout2 and output current value Iout2 from the second power conversion device illustrated in FIG. 8.
Figure 9C:
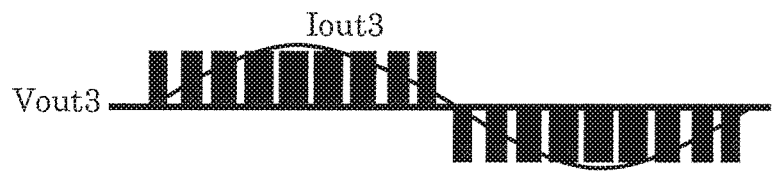
FIG. 9C illustrates waveforms of output voltage value Vout3 and output current value Iout3 from the third power conversion device illustrated in FIG. 8.

FIG. 9A illustrates waveforms of output voltage value Vout1 and output current value Iout1 from first power conversion device 20a illustrated in FIG. 8. FIG. 9B illustrates waveforms of output voltage value Vout2 and output current value Iout2 from second power conversion device 20b illustrated in FIG. 8. FIG. 9C illustrates waveforms of output voltage value Vout3 and output current value Iout3 from third power conversion device 20c illustrated in FIG. 8. With the bipolar PWM method, the amplitude of output voltage value Vout1 defined by two levels is fixed, and thus does not fluctuate in the vicinity of the zero-crossover point. Accordingly, zero-crossover distortion is less than with the clamping method.

The plurality of power conversion devices 20a, 20b, 20c . . . illustrated in FIG. 8 are connected by communication line 50. For example, the plurality of power conversion devices 20a, 20b, 20c . . . transmit and receive data to and from one another via half-duplex communication in conformity with a predetermined serial communications standard (for example, RS-485).

The first operating mode and the second operating mode described above are modes in accordance with the switching method used for the inverter circuit, and examples include a voltage control method and current control method as modes in accordance with an output target. The voltage control method is a method of controlling feedback so as to adjust the output voltage value to match a target voltage value, and the current control method is a method of controlling feedback so as to adjust the output current value to match a target current value.

When all of the plurality of power conversion devices 20a, 20b, 20c . . . illustrated in FIG. 8 are operated via the voltage control method, a synchronization signal and a status signal indicating the status of the operating mode (switching method) are transmitted between power conversion devices 20a, 20b, 20c, and so on. This allows each of the plurality of power conversion devices 20a, 20b, 20c . . . to share their operating mode with each other.

Figure 10:
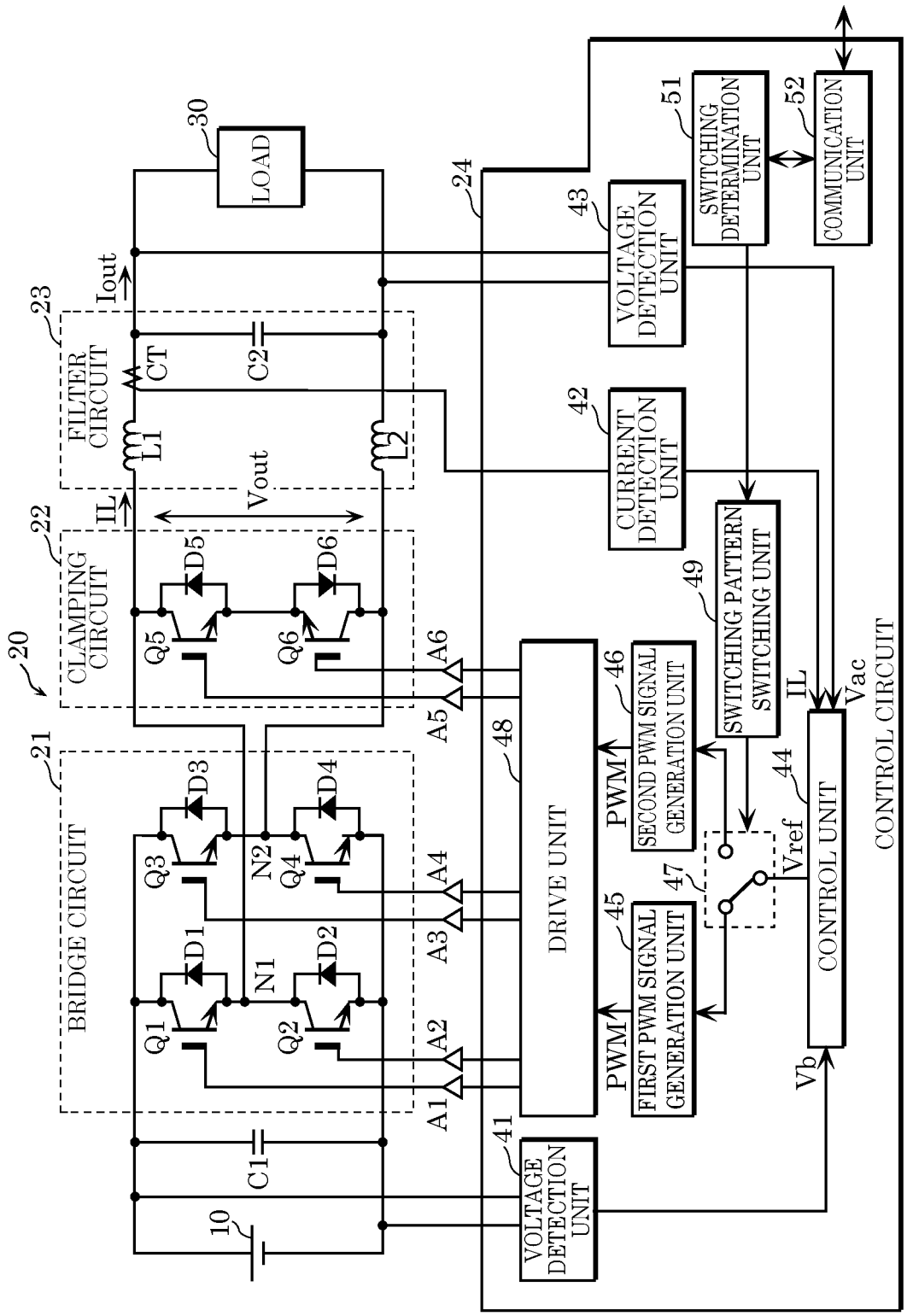
FIG. 10 illustrates a configuration of a power conversion device used in the power conversion system illustrated in FIG. 8.

FIG. 10 illustrates a configuration of power conversion device 20 used in power conversion system 1 illustrated in FIG. 8. This power conversion device 20 is achieved by adding switching determination unit 51 and communication unit 52 to the configuration of power conversion device 20 illustrated in FIG. 1. Communication unit 52 accesses communication line 50 and communicates with other power conversion devices 20. Switching determination unit 51 notifies another power conversion device 20 of its own operating mode and obtains notification of an operating mode from another power conversion device 20 via communication unit 52.

FIG. 11 illustrates one example of operating mode list table 51a stored in switching determination unit 51 illustrated in FIG. 10. Operating mode list table 51a stores the operating modes of the plurality of power conversion devices 20a, 20b, 20c . . . connected in parallel.

FIG. 12 is a flow chart of the basic operations performed by switching determination unit 51 illustrated in FIG. 10. After elapse of a predetermined length of time (Y in S10), switching determination unit 51 communicates with switching determination unit 51 of another power conversion device 20 to notify the other power conversion device 20 of its own operating mode and obtain the operating mode of the other power conversion device 20 (S11). Here, if there is a power conversion device 20 that is not operating, the operating mode of that power conversion device 20 is updated to "not operating". Note that notification of a change in status may be performed only in cases in which there is a change in status from the previous communication.

Switching determination unit 51 updates operating mode list table 51a based on the operating mode of the other power conversion device 20 obtained via the communication (S12). Here, switching determination unit 51 calculates the total output power from power conversion devices 20 that are turned on and calculates a total capacitance of power conversion devices 20 that are turned on. Furthermore, switching determination unit 51 divides the total capacitance of power conversion devices 20 that are turned on by the output capacitance of power conversion devices 20 that are operating in the second operating mode to calculate a proportion of power conversion devices 20 that are operating in the second operating mode. Note that with systems in which the amount of generated power fluctuates depending on, for example, amount of sunlight, such as is the case with a solar power generating system, in the communication in step S11, there is a need to exchange notifications of amount of generated power as well. Note that when power conversion devices 20 are operated in parallel so as to achieve uniform output power, instead of the capacitance of power conversion devices 20 that are turned on, the number of power conversion devices 20 that are turned on may be used.

Switching determination unit 51 determines an operating mode for power conversion device 20 it is included in that will bring the proportion of power conversion devices 20 operating in the second operating mode to within a predetermined range, and sets the determined operating mode in the switching pattern switching unit 49. Switching pattern switching unit 49 controls switch unit 47 in accordance with the operating mode set.

Processes according to step S11 and step S12 are repeatedly performed (S13N) for a predetermined period (S10) until operation of power conversion device 20 is stopped (Y in S13).

With these basic operations, since switching determination unit 51 in each power conversion device 20 independently switches operating modes at the same time, there is a chance that the proportion of power conversion devices 20 operating in the second operating mode after switching will exceed or fall short of the predetermined range.

Figure 13:
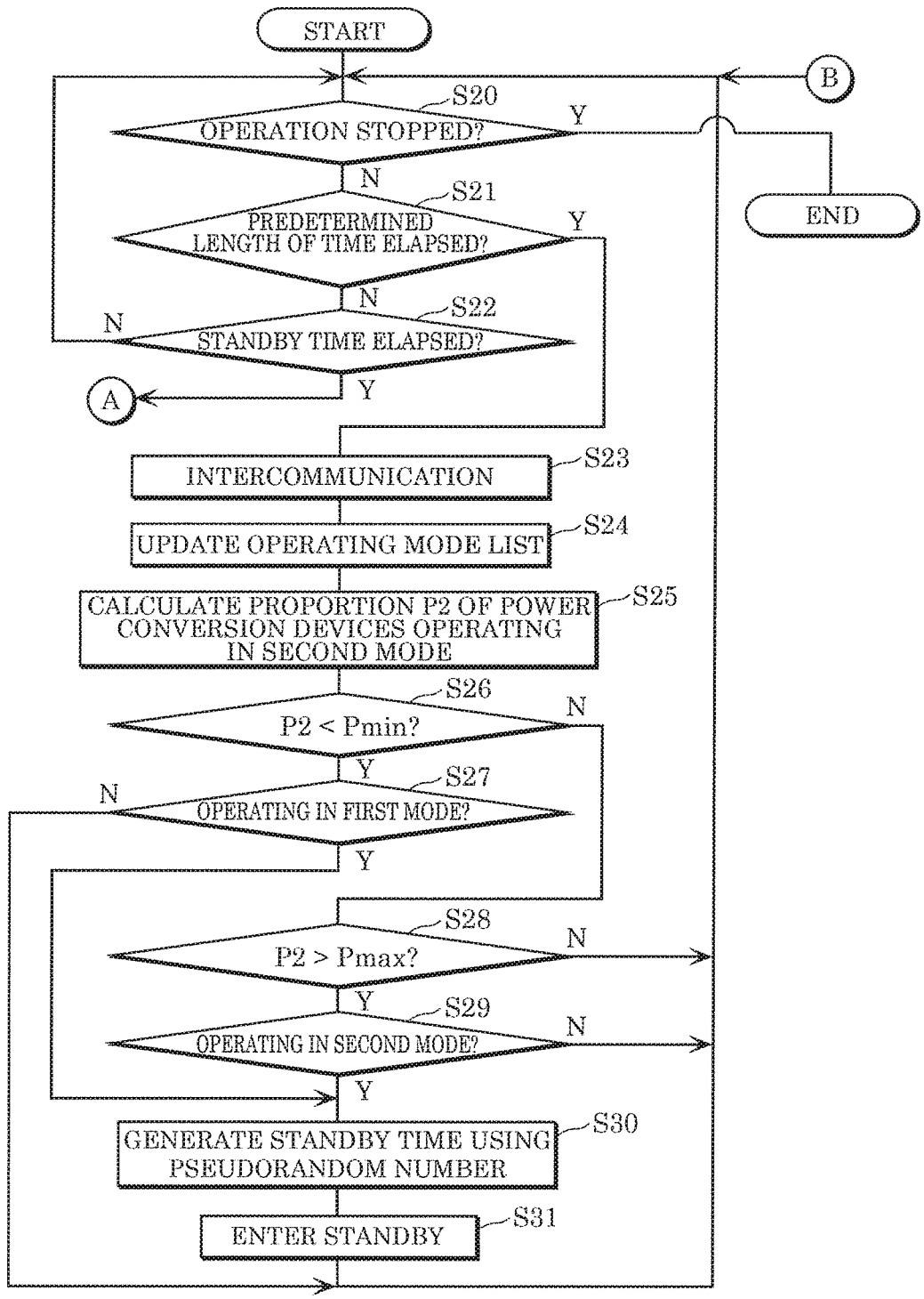
FIG. 13 is a flow chart (first flow chart) of an example of practical operations performed by the switching determination unit illustrated in FIG. 10.
Figure 14:
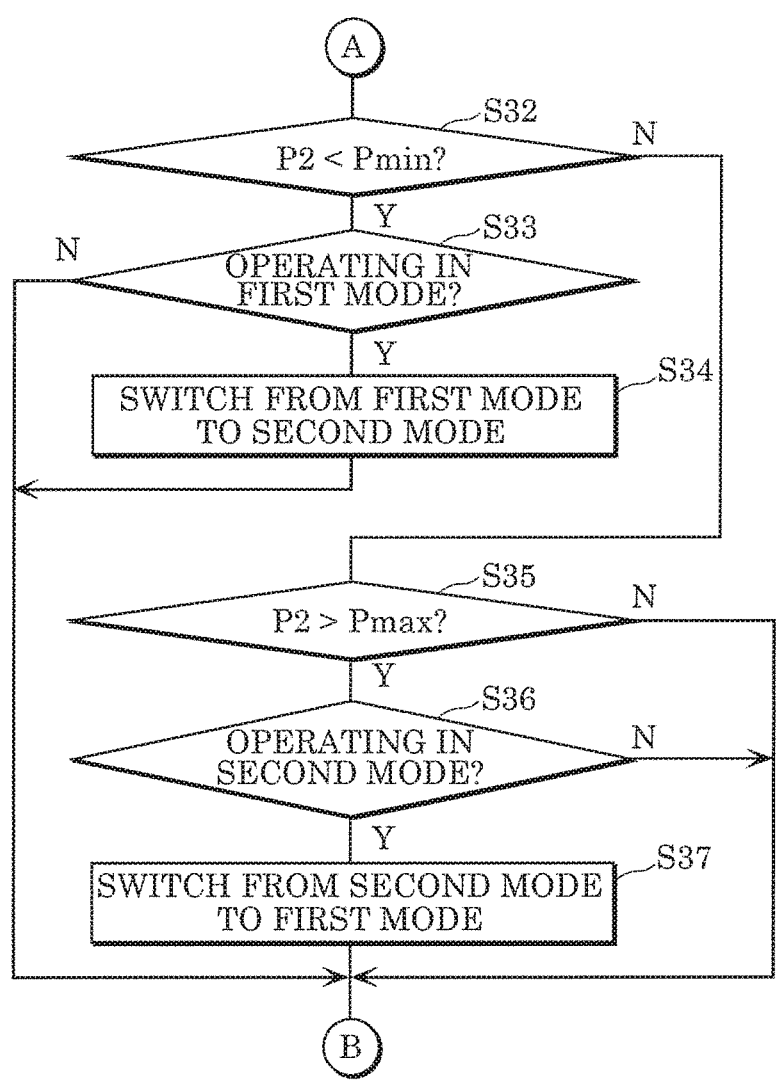
FIG. 14 is a flow chart (second flow chart) of an example of practical operations performed by the switching determination unit illustrated in FIG. 10.

FIG. 13 is a flow chart (first flow chart) of an example of practical operations performed by switching determination unit 51 illustrated in FIG. 10. FIG. 14 is a flow chart (second flow chart) of an example of practical operations performed by switching determination unit 51 illustrated in FIG. 10. The exemplary practical operations include a mechanism for preventing the proportion of power conversion devices 20 operating in the second operating mode after switching from exceeding or falling short of the predetermined range.

After starting operation of power conversion device 20, when operation of power conversion device 20 is stopped (Y in S20) by, for example, a user or by the system detecting an abnormality, the processing illustrated in the flow chart is ended. While power conversion device 20 is operating (N in S20), after elapse of a predetermined length of time from start of the operation or from the last communication (Y in S21), switching determination unit 51 communicates with switching determination unit 51 in another power conversion device 20, notifies the other power conversion device 20 of its own operating mode, and obtains the operating mode from the other power conversion device 20 (S23).

Switching determination unit 51 updates operating mode list table 51*a* based on the operating mode of the other power conversion device 20 obtained via the communication (S24).

Switching determination unit 51 calculates proportion P2 of power conversion devices 20 that operate in the second operating mode, based on the updated operating mode (S25). Switching determination unit 51 compares proportion P2 and minimum value Pmin of the predetermined range (S26). When proportion P2 is smaller than minimum value Pmin (Y in S26), switching determination unit 51 determines whether power conversion device 20 in which it is included is operating in the first operating mode or not (S27). When not operating in the first operating mode (N in S27), the current status is maintained, and processing returns to step S20. When operating in the first operating mode (Y in S27), switching determination unit 51 uses a pseudorandom number to generate a standby time (S30). After the standby time is generated, power conversion device 20 in which switching determination unit 51 is included enters standby (S31), and processing returns to step S20.

In step S26, when proportion P2 is greater than or equal to minimum value Pmin (N in S26), switching determination unit 51 compares proportion P2 and maximum value Pmax of the predetermined range (S28). When proportion P2 is less than or equal to maximum value Pmax (N in S28), the current status is maintained, and processing returns to step S20. When proportion P2 is greater than maximum value Pmax (Y in S28), switching determination unit 51 determines whether power conversion device 20 in which it is included is operating in the second operating mode or not (S29). When not operating in the second operating mode (N in S29), the current status is maintained, and processing returns to step S20. When operating in the second operating mode (Y in S29), switching determination unit 51 uses a pseudorandom number to generate a standby time (S30). After the standby time is generated, power conversion device 20 in which switching determination unit 51 is included enters standby (S31), and processing returns to step S20.

In step S21, before elapse of the predetermined length of time beginning at the previous communication (N in S21), if the standby time generated in step S30 has elapsed (Y in S22) since entering standby in step S31, processing proceeds to step S32 in FIG. 14.

Switching determination unit 51 once again compares proportion P2 and minimum value Pmin (S32). When proportion P2 is smaller than minimum value Pmin (Y in S32), switching determination unit 51 determines whether power conversion device 20 in which it is included is operating in the first operating mode or not (S33). When not operating in the first operating mode (N in S33), the current status is maintained, and processing returns to step S20. When operating in the first operating mode (Y in S33), switching determination unit 51 switches the operating mode of power conversion device 20 in which it is included from the first operating mode to the second operating mode (S34). Thereafter, processing returns to step S20.

In step S32, when proportion P2 is greater than or equal to minimum value Pmin (N in S32), switching determination unit 51 compares proportion P2 and maximum value Pmax (S35). When proportion P2 is less than or equal to maximum value Pmax (N in S35), the current status is maintained, and processing returns to step S20. When proportion P2 is greater than maximum value Pmax (Y in S35), switching determination unit 51 determines whether power conversion device 20 in which it is included is operating in the second operating mode or not (S36). When not operating in the second operating mode (N in S36), the current status is maintained, and processing returns to step S20. When operating in the second operating mode (Y in S36), switching determination unit 51 switches the operating mode of power conversion device 20 in which it is included from the second operating mode to the first operating mode (S37). Thereafter, processing returns to step S20.

Figure 15:
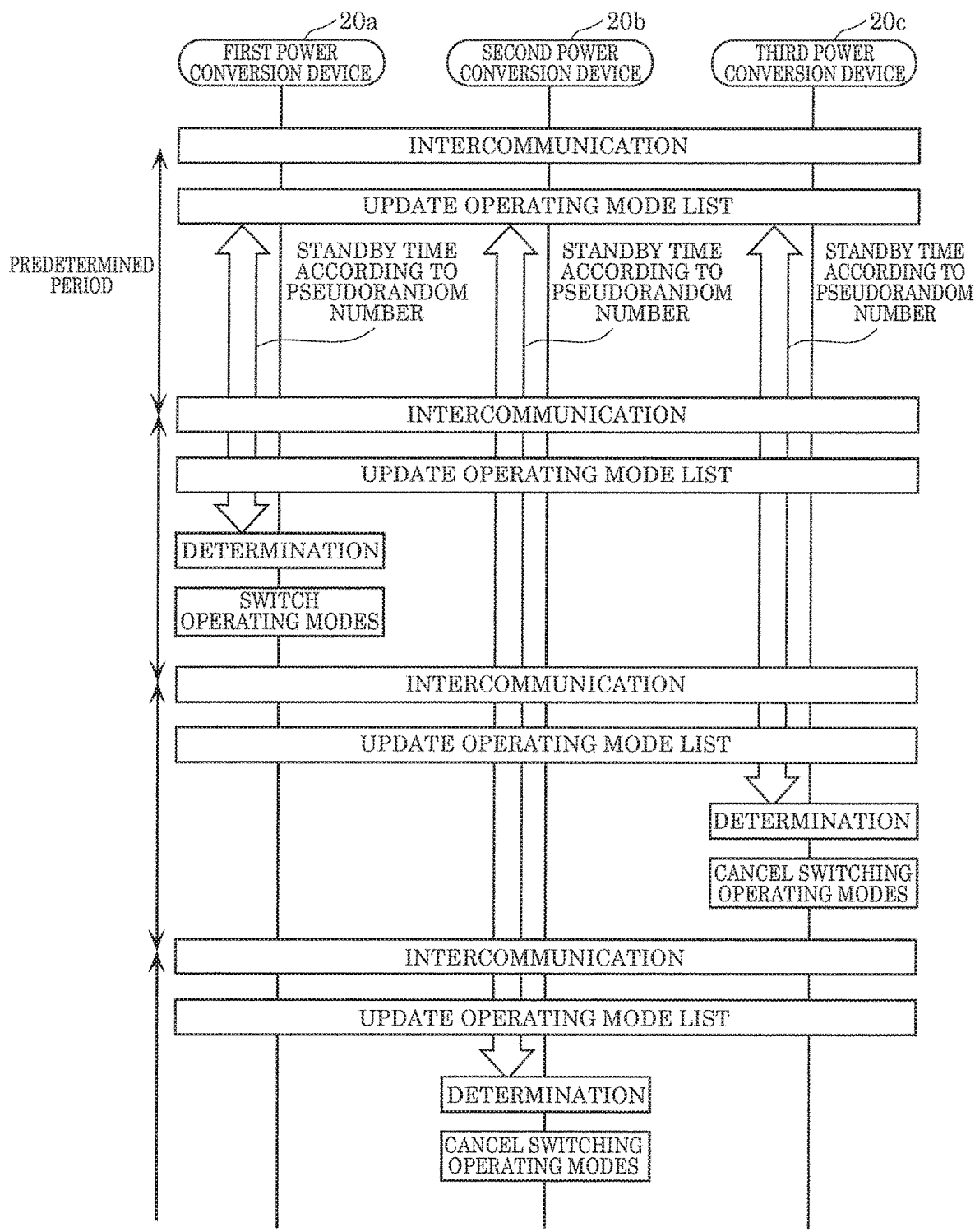
FIG. 15 illustrates one example of processes for switching operating modes using the examples of the practical operations illustrated in FIG. 13 and FIG. 14.

FIG. 15 illustrates one example of the processes for switching operating modes using the examples of the practical operations illustrated in FIG. 13 and FIG. 14. In this example, three power conversion devices—first power conversion device 20*a*, second power conversion device 20*b*, and third power conversion device 20*c*—operate in parallel. In the initial operating mode list update process, the proportion of power conversion devices 20 operating in the second operating mode is exemplified as being outside the predetermined range. Switching determination units 51 in first power conversion device 20*a*, second power conversion device 20*b*, and third power conversion device 20*c* generate standby times by using pseudorandom numbers. In the example illustrated in FIG. 15, the standby time for first power conversion device 20*a* is the shortest, the standby time for third power conversion device 20*c* is the next shortest, and the standby time for second power conversion device 20*b* is the longest.

In the next operating mode list update process, switching determination unit 51 in first power conversion device 20*a* switches operating modes. Since second power conversion device 20*b* and third power conversion device 20*c* are in standby, the switching of the operating modes therefore is not performed.

In the next operating mode list update process, switching determination unit 51 in third power conversion device 20*c* that exited standby determines once again whether the proportion of power conversion devices 20 operating in the second operating mode is within the predetermined range or not. In the example illustrated in FIG. 15, the proportion of power conversion devices 20 operating in the second operating mode falls within the predetermined range once first power conversion device 20*a* switches operating modes. Based on the result of the second determination, switching determination unit 51 in third power conversion device 20*c* stops the switching of operating modes.

In the next operating mode list update process, switching determination unit 51 in second power conversion device 20*b* that exited standby determines once again whether the proportion of power conversion devices 20 operating in the second operating mode is within the predetermined range or not. Based on the result of the second determination, switching determination unit 51 in second power conversion device 20*b* stops the switching of operating modes.

In this way, it is possible to avoid interference between power conversion devices 20 by setting a standby time generated from a pseudorandom number before switching operating modes. A number is generated as the pseudorandom number within a sufficient length of time relative to the period during which communication is performed. This makes it possible to prevent switching of operating modes of a number of power conversion devices 20 in a unit period of time. Note that, in regard to reduction of zero-crossover distortion, since an excessive response is not demanded, there is no dire need to switch the operating modes at high speed; the standby time may be set to a relatively long time.

In power conversion system 1 described above, the plurality of power conversion devices 20*a*, 20*b*, 20*c* . . . are started in the second operating mode. Thereafter, in accordance with the processing described above in the response operation example, some power conversion devices 20 are switched from the second operating mode to the first operating mode. In this way, operation is started in the second operating mode in which zero-crossover distortion is inhibited, and after steadily settling down, some power conversion devices 20 are switched to the first operating mode. This makes it possible to inhibit zero-crossover distortion and gradually increase overall conversion efficiency in power conversion system 1.

According to Embodiment 1 described above, when the plurality of power conversion devices 20 operate in parallel so that one power conversion device 20 operates in the first operating mode and another power conversion device 20 operates in the second operating mode, it is possible to inhibit zero-crossover distortion and highly efficiently perform power conversion. Since the amplitude of voltage can be reduced in the first operating mode, switching loss can be inhibited. However, in the vicinity of the zero-crossover point, distortion is caused by dead-time. On the other hand, in the second operating mode, in the vicinity of the zero-crossover point, distortion is not caused by dead-time. Accordingly, by using a combination of both modes, it is possible to both inhibit zero-crossover distortion and increase conversion efficiency.

Moreover, in either the first operating mode or the second operating mode, regardless of current polarity or voltage polarity, it is possible to suitably control current. Moreover, in either the first operating mode or the second operating mode, it is possible to hold the common mode voltage at a constant value and therefore inhibit an increase in leak current.

Moreover, in order to keep two groups of switching elements that operate complimentarily from being on at the same time, a dead-time period in which both groups of switching elements are off at the same time is provided. This prevents flow-through current and inhibits an increase in power consumption and malfunction.

Moreover, by generating a suitable dead-time error compensation value in accordance with either the first operating mode or the second operating mode and adding it to voltage command value Vrefp, it is possible to reduce the effect of dead-time error.

Moreover, a state in which at least one power conversion device 20 is always operating in the second operating mode is maintained by using a communication means. This makes it possible to prevent a state in which no power conversion device 20 is operating in the second operating mode and avoid an increase in the negative influence of zero-crossover distortion.

Figure 16:
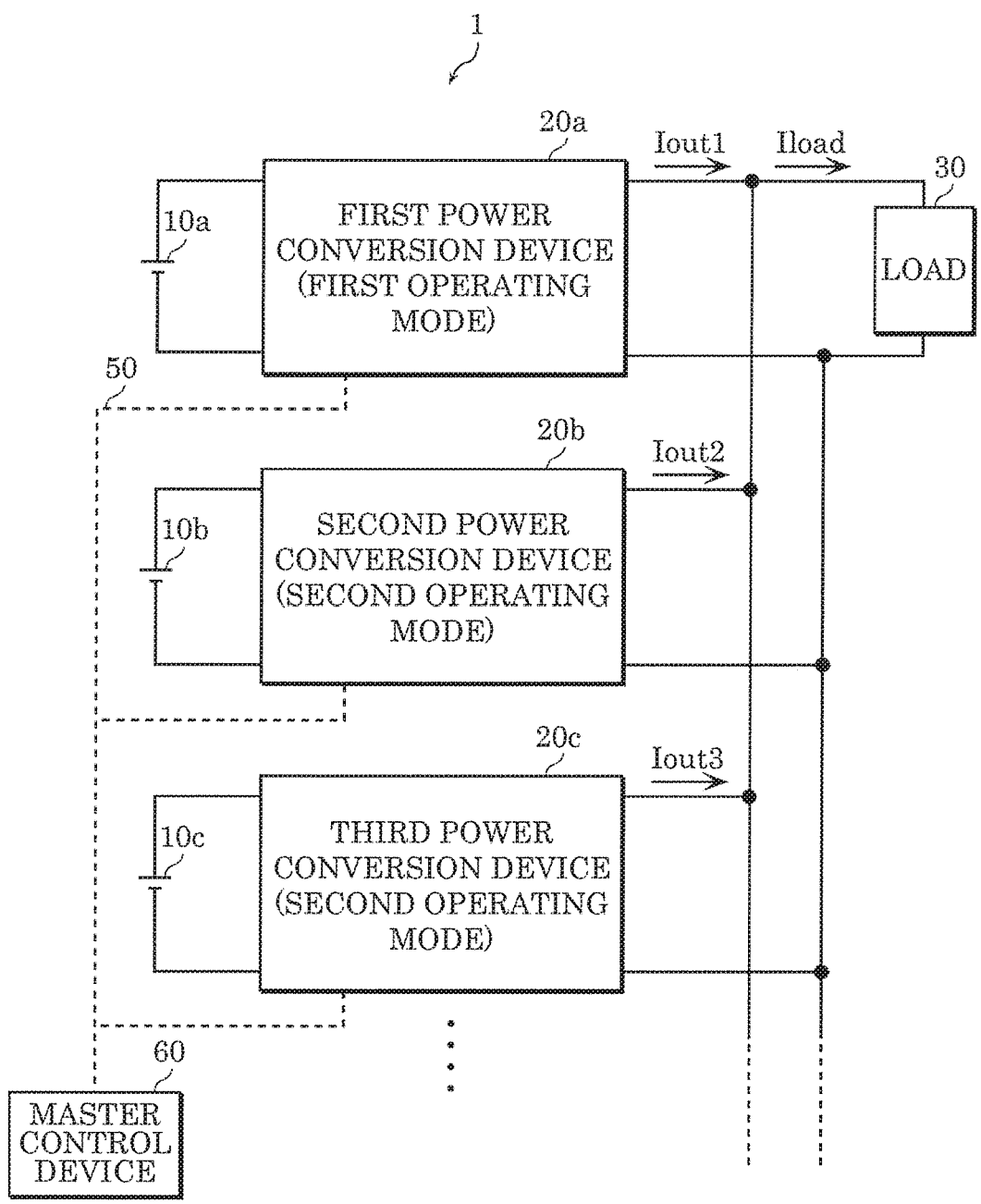
FIG. 16 illustrates a configuration of a power conversion system according to Embodiment 2.

FIG. 16 illustrates a configuration of power conversion system 1 according to Embodiment 2. Power conversion system 1 according to Embodiment 2 is achieved by adding master control device 60 to the configuration of power conversion system 1 according to Embodiment 1, which is illustrated in FIG. 8. Master control device 60 is connected to the plurality of power conversion devices 20a, 20b, 20c . . . via communication line 50, and instructs an operating mode for each of the plurality of power conversion devices 20a, 20b, 20c, and so on.

Figure 17:
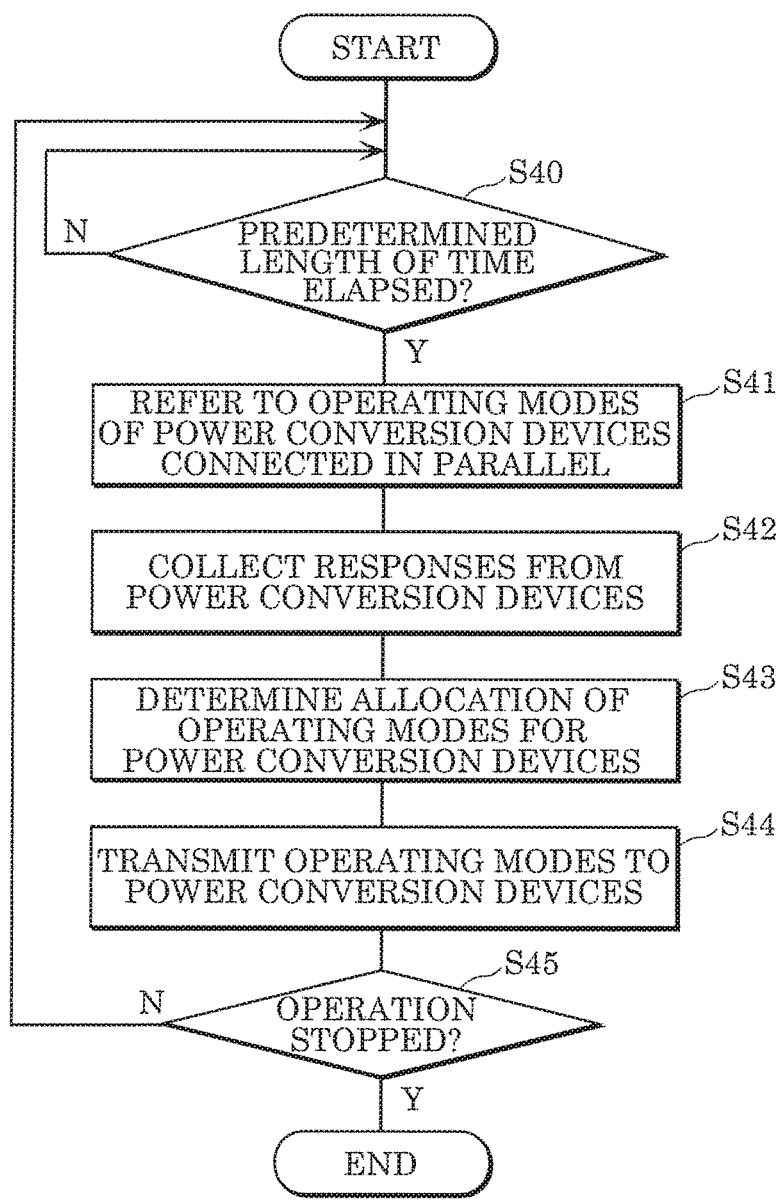
FIG. 17 is a flow chart of basic operations performed by the master control device illustrated in FIG. 16.

FIG. 17 is a flow chart of the basic operations performed by master control device 60 illustrated in FIG. 16. After elapse of a predetermined length of time (Y in S40), master control device 60 refers to the operating mode of each of the plurality of power conversion devices 20a, 20b, 20c . . . (S41). Master control device 60 collects the responses indicating the operating modes from plurality of power conversion devices 20a, 20b, 20c . . . (S42).

Based on the collected operating modes, master control device 60 determines the allocation of operating modes for the plurality of power conversion devices 20a, 20b, 20c . . . so that the proportion of power conversion devices 20 operating in the second operating mode is a predetermined proportion (S43). Master control device 60 transmits the determined operating modes for the plurality of power conversion devices 20a, 20b, 20c . . . to the plurality of power conversion devices 20a, 20b, 20c . . . (S44). Processes according to step S41 through step S44 are repeatedly performed (S45N) for a predetermined period (S40) until operation of power conversion system 1 is stopped (Y in S45).

Embodiment 2 described above achieves the same advantages effects as with Embodiment 1. Furthermore, since master control device 60, which is shared in common among and higher in tier than the plurality of power conversion devices 20, is provided, and master control device 60 allocates an operating mode to each power conversion device 20, it is possible to omit switching determination unit 51 in each power conversion device 20.

Moreover, there is no need for the plurality of power conversion devices 20 to communicate with each other; each power conversion device 20 may simply communicate with master control device 60, thereby simplifying the communication process. Moreover, if the reference to the operating modes and collection process described in step S41 and step S42 in FIG. 17 are omitted, one-way communication from master control device 60 to power conversion device 20 is possible, which makes it possible to achieve a low-cost communication means compared to when two-way communication is used.

Figure 18:
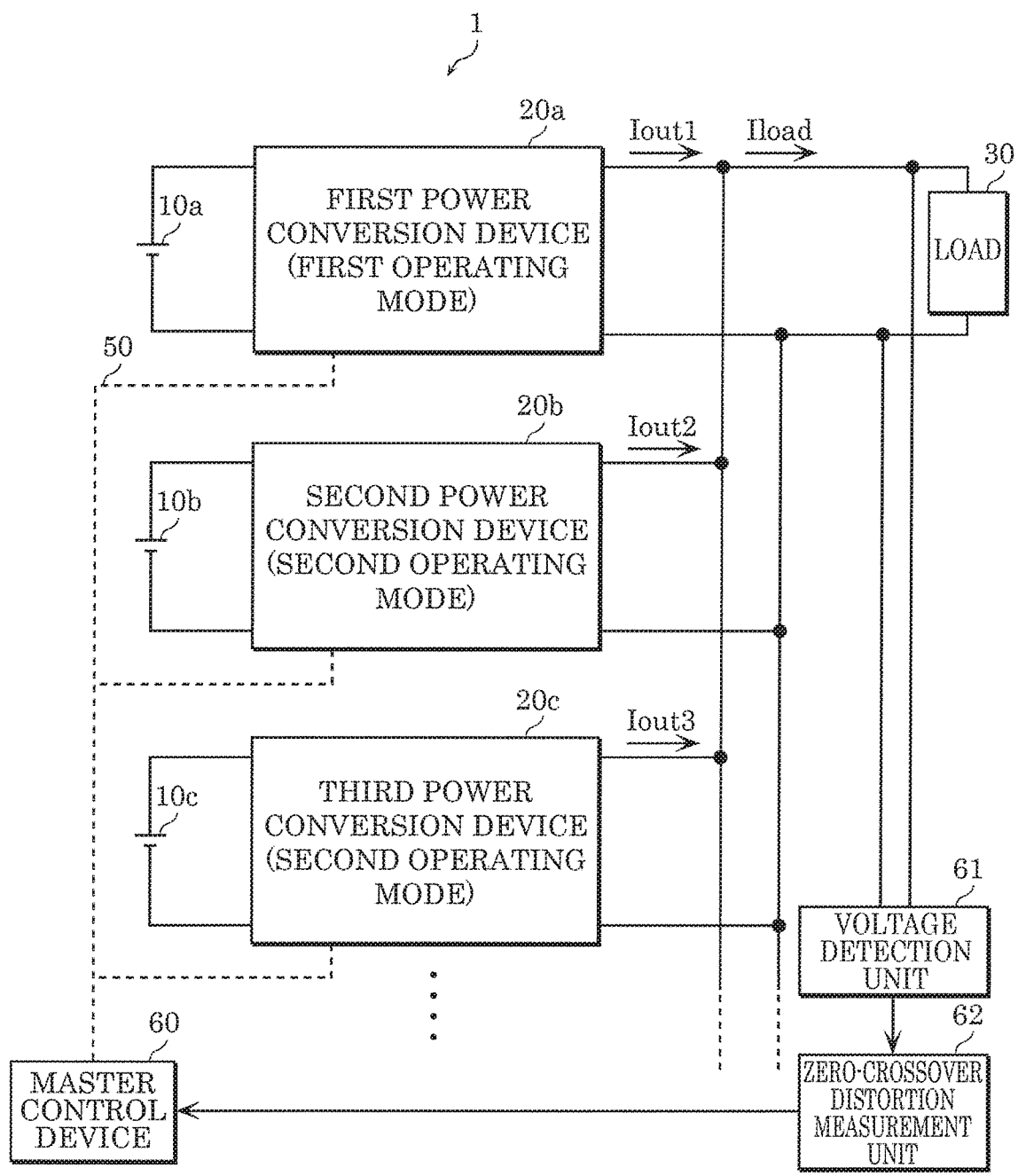
FIG. 18 illustrates a configuration of a power conversion system according to a variation of Embodiment 2.

FIG. 18 illustrates a configuration of power conversion system 1 according to a variation of Embodiment 2. Power conversion system 1 according to this variation of Embodiment 2 is achieved by adding voltage detection unit 61 and zero-crossover distortion measurement unit 62 to the configuration of power conversion system 1 according to Embodiment 2, which is illustrated in FIG. 16.

Voltage detection unit 61 detects the alternating-current voltage applied to load 30 which is supplied with alternating-current power from power conversion system 1. Zero-crossover distortion measurement unit 62 measures the zero-crossover distortion from the detected alternating-current voltage. In accordance with the magnitude of the zero-crossover distortion measured by zero-crossover distortion measurement unit 62, master control device 60 adaptively changes the proportion of power conversion devices 20 that are operating in the second operating mode from among the plurality of power conversion devices 20a, 20b, 20c, and so on. More specifically, the greater the measured zero-crossover distortion is, the greater the proportion is increased, and the less the measured zero-crossover distortion is, the greater the proportion is decreased.

In this way, according to this variation of Embodiment 2, the zero-crossover distortion of the voltage applied to load 30 is measured, and in accordance with the measured zero-crossover distortion, the proportion of power conversion devices 20 operating in the second operating mode is changed. This makes it possible to keep the zero-crossover distortion of the voltage applied to load 30 below or equal to a constant value. Moreover, it is possible to achieve operation in which the balance between inhibition of zero-crossover distortion and high efficiency is optimized.

Figure 19:
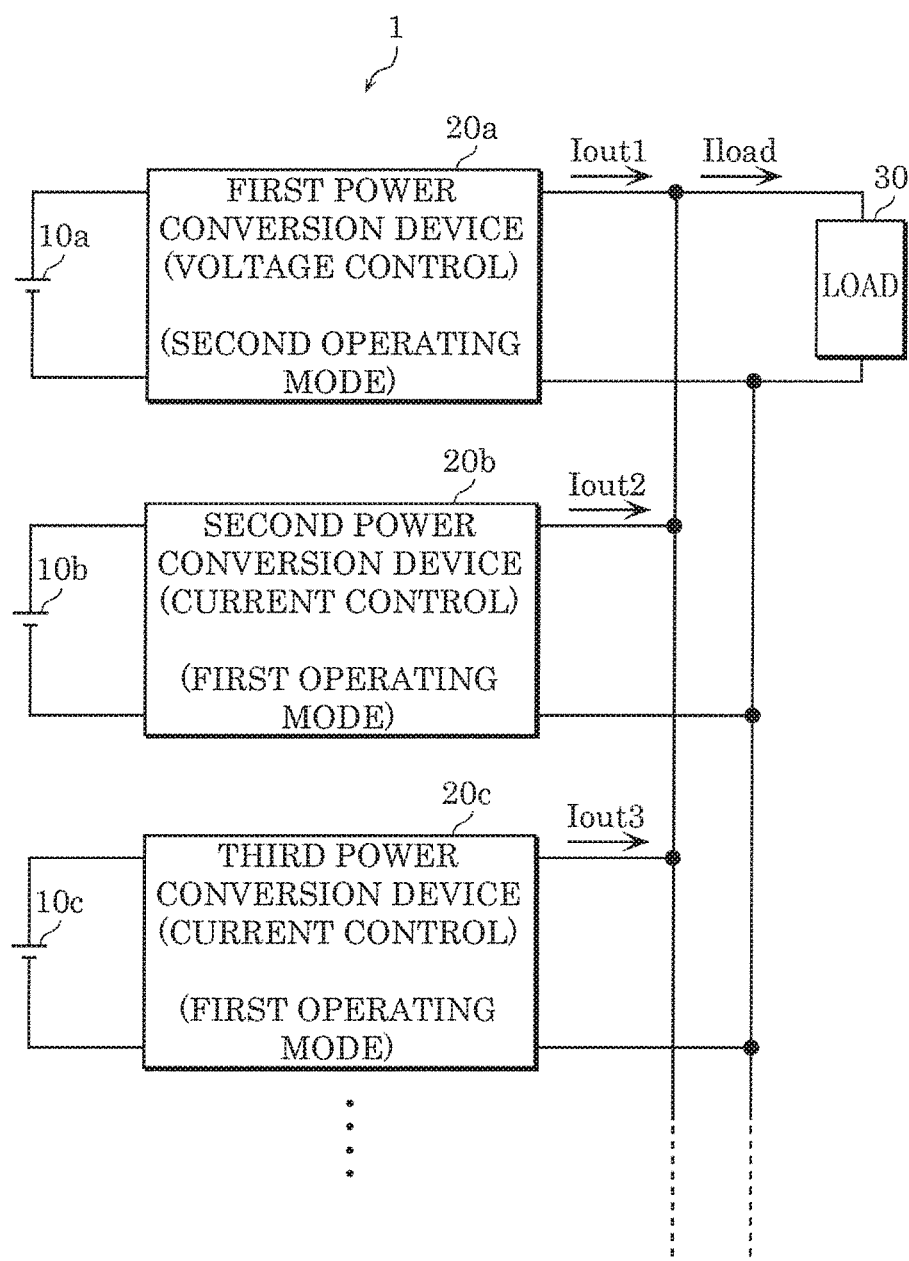
FIG. 19 illustrates a configuration of a power conversion system according to Embodiment 3.

FIG. 19 illustrates a configuration of power conversion system 1 according to Embodiment 3. With power conversion system 1 according to Embodiment 3, one power conversion device 20 among the plurality of power conversion devices 20*a*, 20*b*, 20*c* . . . is operated in accordance with the voltage control method, and the remaining power conversion devices 20 are operated in accordance with the current control method. In the example illustrated in FIG. 19, first power conversion device 20*a* is operated in accordance with the voltage control method, and second power conversion device 20*b*, third power conversion device 20*c* . . . are operated in accordance with the current control method.

Power conversion device 20 operated in accordance with the voltage control method stipulates an alternating-current output voltage for power conversion system 1, and power conversion devices 20 operated in accordance with the current control method superimpose output current onto this alternating-current voltage. Power conversion device 20 operated in accordance with the voltage control method does not stipulate an output current, but rather outputs current calculated by subtracting, from current consumed by load 30, output current from power conversion devices 20 operated in accordance with the current control method. In other words, from the viewpoint of power conversion device 20 operated in accordance with the voltage control method, the capacitance of load 30 appears as a capacitance minus the output capacitance from power conversion device 20 operated in accordance with the voltage control method. Note that there is no need for communication for achieving synchronization between the plurality of power conversion devices 20*a*, 20*b*, 20*c*, and so on.

In the above-described configuration, power conversion device 20 operated in accordance with the voltage control method is operated in the second operating mode, and power conversion devices 20 operated in accordance with the current control method are operated in the first operating mode. Since power conversion device 20 operated in accordance with the voltage control method stipulates the alternating-current output voltage of power conversion system 1, it is operated in the second operating mode which results in low zero-crossover distortion. On the other hand, power conversion devices 20 operated in accordance with the current control method are operated in the high-efficiency first operating mode.

Embodiment 3 described above achieves the same advantages effects as with Embodiment 1. Furthermore, since communication line 50 is not necessary, power conversion system 1 can be built at a low cost.

Figure 20:
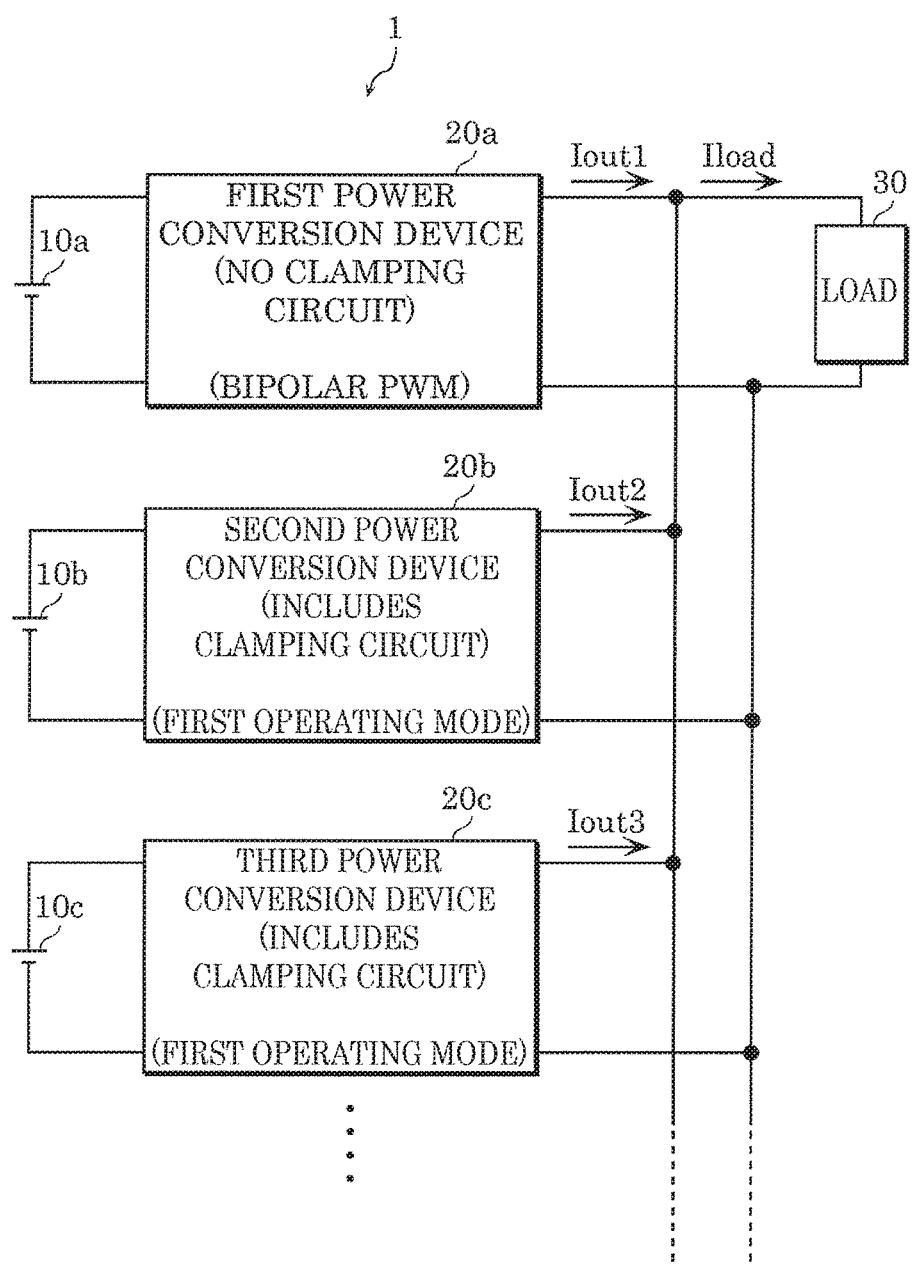
FIG. 20 illustrates a configuration of a power conversion system according to Embodiment 4.

FIG. 20 illustrates a configuration of power conversion system 1 according to Embodiment 4. With power conversion system 1 according to Embodiment 4, a combination of a power conversion device 20 that includes clamping circuit 22 and a power conversion device 20 that does not include clamping circuit 22 is used. Power conversion device 20 that does not include clamping circuit 22 does not support the clamping method that corresponds to the first operating mode; it is always driven using the bipolar PWM method corresponding to the second operating mode. Power conversion device 20 that includes clamping circuit 22 operates in the first operating mode. In the example illustrated in FIG. 20, first power conversion device 20*a* is the power conversion device 20 that does not include clamping circuit 22, and second power conversion device 20*b* and third power conversion device 20*c* are power conversion devices 20 that include clamping circuit 22.

Figure 21:
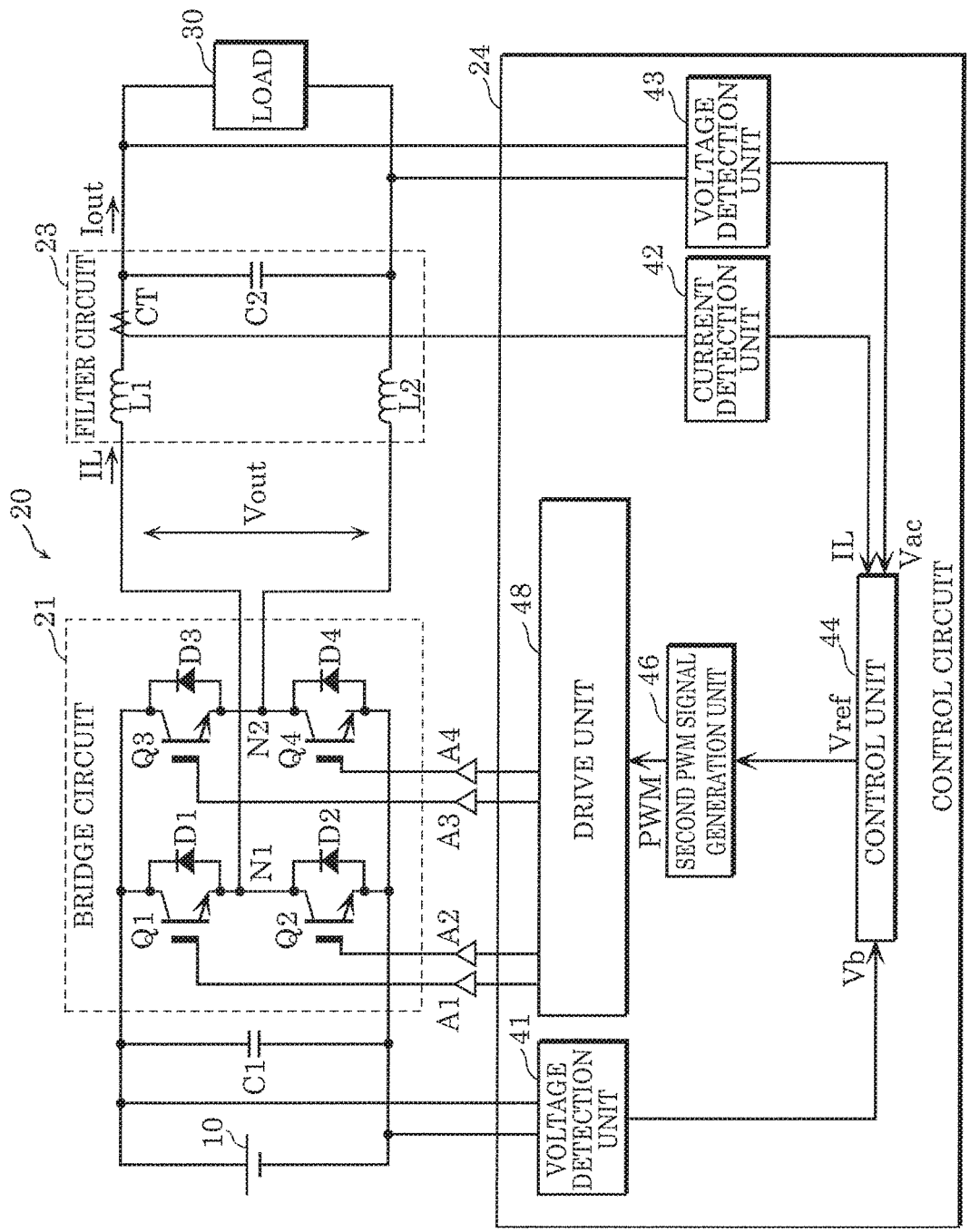
FIG. 21 illustrates a configuration of a power conversion device that does not include a clamping circuit.

FIG. 21 illustrates a configuration of power conversion device 20 that does not include clamping circuit 22. Compared to power conversion device 20 illustrated in FIG. 1, clamping circuit 22, first PWM signal generation unit 45, switch unit 47, switching pattern switching unit 49, fifth amplifier A5, and sixth amplifier A6 are omitted.

Embodiment 4 described above achieves the same advantages effects as with Embodiment 1. When a power conversion device 20 that supports the clamping method is connected to a pre-existing power conversion device 20 that does not support the clamping method, it is possible to achieve power conversion system 1 that can inhibit zero-crossover distortion and perform high-efficient power conversion.

The present invention is hereinbefore described based on embodiments. The embodiments are examples; variations are possible by combining various elements and processes. Those skilled in the art will appreciate that such variations also fall within the scope of the present invention.

For example, in Embodiment 2, master control device 60 is exemplified as being external to the plurality of power conversion devices 20. The functions of master control device 60 may be implemented inside control circuit 24 in any one of the plurality of power conversion devices 20.

Moreover, in the above embodiments, clamping circuit 22 is exemplified as including two switching elements. However, the number of switching elements included in clamping circuit 22 may be increased so as to make clamping circuit 22 capable of outputting three or more levels of voltage to filter circuit 23. For example, in the first operating mode, five levels of voltage may be output to filter circuit 23. In such cases, the amplitude of voltage can be further reduced in the first operating mode, and switching loss can be further inhibited.

Moreover, power conversion device 20 may include an operation unit (for example, a switch) that allows the user to switch between the first operating mode and the second operating mode. Control circuit 24 receives a mode selection signal including the operating mode selected by the user from the operation unit and determines the operating mode in accordance with the mode selection signal.

Note that the embodiments may be specified by the following articles.

(Item 1)

A power conversion device (20) is characterized as including: a bridge circuit (21) capable of converting input direct-current voltage and outputting alternating-current voltage; a filter circuit (23) that attenuates a high-frequency component of the alternating-current voltage output by the bridge circuit (21); a clamping circuit (22) disposed between the bridge circuit (21) and the filter circuit (23), and capable of short-circuiting an output side of the bridge circuit (21); and a control circuit (24) that controls switching elements (Q1 through Q6) included in the bridge circuit (21) and the clamping circuit (22). The control circuit (24) has a first mode in which the switching elements (Q1 through Q6) cause the alternating-current voltage to be output to the filter circuit (23) at three or more voltage levels, and a second mode in which the switching elements (Q1 through Q6) cause the alternating-current voltage to be output to the filter circuit (23) at two voltage levels. When power conversion devices (20) have their alternating-current side output paths connected and operate in parallel, at least one of the power conversion devices (20) operating in parallel operates in the second mode.

This makes it possible to inhibit zero-crossover distortion and perform high-efficiency power conversion.

(Item 2)

The power conversion device (20) according to Item 1, characterized in that the bridge circuit (21) includes a first switching element (Q1) and a second switching element (Q2) connected in series, and a third switching element (Q3) and a fourth switching element (Q4) connected in series, both terminals of the first switching element (Q1) and the second switching element (Q2) and both terminals of the third switching element (Q3) and the fourth switching element (Q4) are connected in parallel to a direct-current power supply (10), and the clamping circuit (22) includes a fifth switching element (Q5) and a sixth switching element (Q6) connected in series and disposed oriented in opposite directions. In the first mode, when the voltage command value that instructs the switching on and off of the switching elements (Q1 through Q6) is positive, the control circuit (24) switches the second switching element (Q2) and the third switching element (Q3) off, switches the sixth switching element (Q6) on, and complementarily switches (i) the first switching element (Q1) and the fourth switching element (Q4) and (ii) the fifth switching element (Q5) on and off. In the first mode, when the voltage command value is negative, the control circuit (24) switches the first switching element (Q1) and the fourth switching element (Q4) off, switches the fifth switching element (Q5) on, and complementarily switches (i) the second switching element (Q2) and the third switching element (Q3) and (ii) the sixth switching element (Q6) on and off. In the second mode, the control circuit (24) switches the fifth switching element (Q5) and the sixth switching element (Q6) off, and complementarily switches (i) the first switching element (Q1) and the fourth switching element (Q4) and (ii) the second switching element (Q2) and the third switching element (Q3) on and off.

This makes it possible to output three levels of voltage in the first mode and output two levels of voltage in the second mode.

(Item 3)

The power conversion device (20) according to Item 1 or 2, characterized as further including a communication unit (52) for notifying an operating mode of the power conversion device (20) in which it is included to another power conversion device (20) that is operating in parallel.

This makes it possible for power conversion devices (20) operating in parallel to share their operating modes.

(Item 4)

A power conversion system (1), characterized as including a plurality of power conversion devices (20) whose alternating-current side output paths are connected and that operate in parallel. Each of the plurality of power conversion devices (20) includes: a bridge circuit (21) capable of converting input direct-current voltage and outputting alternating-current voltage; a filter circuit (23) that attenuates a high-frequency component of the alternating-current voltage output by the bridge circuit (21); and a clamping circuit (22) disposed between the bridge circuit (21) and the filter circuit (23), and capable of short-circuiting an output side of the bridge circuit (21). Among the plurality of power conversion devices (20), the bridge circuit (21) and the clamping circuit (22) included in at least one power conversion device (20) operate in a first mode in which the alternating-current voltage is output to the filter circuit (23) at three or more voltage levels, and the bridge circuit (21) and the clamping circuit (22) included in each remaining power conversion device (20) operate in a second mode in which the alternating-current voltage is output to the filter circuit (23) at two voltage levels.

This makes it possible to inhibit zero-crossover distortion and perform high-efficiency power conversion.

(Item 5)

The power conversion system according to Item 4, characterized in that the bridge circuit (21) includes a first switching element (Q1) and a second switching element (Q2) connected in series, and a third switching element (Q3) and a fourth switching element (Q4) connected in series, both terminals of the first switching element (Q1) and the second switching element (Q2) and both terminals of the third switching element (Q3) and the fourth switching element (Q4) are connected in parallel to a direct-current power supply (10), and the clamping circuit (22) includes a fifth switching element (Q5) and a sixth switching element (Q6) connected in series and disposed oriented in opposite directions. In the first mode, when alternating-current voltage output from the filter circuit (23) is positive, the second switching element (Q2) and the third switching element (Q3) are switched off, the sixth switching element (Q6) is switched on, and (i) the first switching element (Q1) and the fourth switching element (Q4) and (ii) the fifth switching element (Q5) are complementarily switched on and off. In the first mode, when the alternating-current voltage output from the filter circuit (23) is negative, the first switching element (Q1) and the fourth switching element (Q4) are switched off, the fifth switching element (Q5) is switched on, and (i) the second switching element (Q2) and the third switching element (Q3) and (ii) the sixth switching element (Q6) are complementarily switched on and off. In the second mode, the fifth switching element (Q5) and the sixth switching element (Q6) are switched off, and (i) the first switching element (Q1) and the fourth switching element (Q4) and (ii) the second switching element (Q2) and the third switching element (Q3) are complementarily switched on and off.

This makes it possible to output three levels of voltage in the first mode and output two levels of voltage in the second mode.

(Item 6)

The power conversion system (1) according to Item 4 or 5, characterized in that each of the plurality of power conversion devices (20) further includes a communication unit (51) for notifying an operating mode of the power conversion device (20) in which it is included to another power conversion device (20) that is operating in parallel.

This makes it possible for power conversion devices (20) operating in parallel to share their operating modes.

(Item 7)

The power conversion system (1) according to Item 6, characterized in that the plurality of power conversion devices (20) are started in the second mode, and subsequently one or more of the plurality of power conversion devices (20) switches to the first mode.

This makes it possible to inhibit zero-crossover distortion upon start up.

(Item 8)

The power conversion system (1) according to Item 4 or 5, characterized as further including: a control device (60) that specifies an operating mode for each of the plurality of power conversion devices (20).

This makes it possible to comprehensively manage the operating modes.

(Item 9)

The power conversion system (1) according to Item 8, characterized as further including: a voltage detection unit (61) configured to detect alternating-current voltage applied to a load (30) supplied with alternating-current power from the power conversion system (1); and a zero-crossover distortion measurement unit (62) configured to measure a zero-crossover distortion from the alternating-current voltage detected. The control device (60) determines a proportion of the plurality of power conversion devices (20) to operate in the second mode according to a magnitude of the

19 zero-crossover distortion measured by the zero-crossover distortion measurement unit (61).

(Item 10)

The power conversion system (1) according to Item 4 or 5, characterized in that among the plurality of power conversion devices (20), one is a voltage control method power conversion device (20), and each remaining one is a current control method power conversion device (20), and the voltage control method power conversion device (20) operates in the second mode, and each current control method power conversion device (20) operates in the first mode.

This makes it possible to inhibit zero-crossover distortion and perform high-efficiency power conversion.

(Item 11)

A power conversion system (1) is characterized as including a first power conversion device (20a) and a second power conversion device (20b). The first power conversion device (20a) and the second power conversion device (20b) have alternating-current side output paths that are connected, and operate in parallel. The first power conversion device (20a) includes: a first bridge circuit (21) capable of converting input direct-current voltage and outputting alternating-current voltage; a first filter circuit (23) that attenuates a high-frequency component of the alternating-current voltage output by the first bridge circuit (21); and a clamping circuit (22) disposed between the first bridge circuit (21) and the first filter circuit (23), and capable of short-circuiting an output side of the first bridge circuit. The first bridge circuit (21) and the clamping circuit (22) operate to output the alternating-current voltage to the first filter circuit (23) at three or more voltage levels. The second power conversion device (20b) includes: a second bridge circuit (21) capable of converting input direct-current voltage and outputting alternating-current voltage at two voltage levels; and a second filter circuit (23) that attenuates a high-frequency component of the alternating-current voltage output by the second bridge circuit (21).

This makes it possible to, when a first power conversion device (20a) including the clamping circuit (22) and a second power conversion device (20b) that does not include the clamping circuit (22) are operating in parallel, inhibit zero-crossover distortion and perform high-efficiency power conversion.

(Item 12)

A power conversion device (20) is characterized as including: a bridge circuit (21) capable of converting input direct-current voltage and outputting alternating-current voltage; a filter circuit (23) that attenuates a high-frequency component of the alternating-current voltage output by the bridge circuit (21); a clamping circuit (22) disposed between the bridge circuit (21) and the filter circuit (23), and capable of short-circuiting an output side of the bridge circuit (21); and a control circuit (24) that controls switching elements (Q1 through Q6) included in the bridge circuit (21) and the clamping circuit (22). The control circuit (24) has a first mode in which the switching elements (Q1 through Q6) cause the alternating-current voltage to be output to the filter circuit (23) at three or more voltage levels, and a second mode in which the switching elements (Q1 through Q6) cause the alternating-current voltage to be output to the filter circuit (23) at two voltage levels, and is configured to be capable of switching between the first mode and the second mode.

This makes it possible to inhibit zero-crossover distortion and perform high-efficiency power conversion.

20

The invention claimed is:

1. A power conversion system, comprising:
a plurality of power conversion devices that operate in parallel and each include two alternating-current side output terminals, a single load being connected between the two alternating-current side output terminals of the plurality of power conversion devices,
wherein each of the plurality of power conversion devices includes:
a bridge circuit capable of converting an input direct-current voltage and outputting an alternating-current voltage;
a filter circuit that attenuates a high-frequency component of the alternating-current voltage output by the bridge circuit; and
a clamping circuit disposed between the bridge circuit and the filter circuit, and capable of short-circuiting an output side of the bridge circuit, and
among the plurality of power conversion devices, the bridge circuit and the clamping circuit included in at least one power conversion device operate in a first mode in which the alternating-current voltage is output to the filter circuit at three or more voltage levels, and, while the at least one power conversion device is operating in the first mode, the bridge circuit and the clamping circuit included in each remaining power conversion device operate in a second mode in which the alternating-current voltage is output to the filter circuit at two voltage levels.

2. The power conversion system according to claim 1, wherein
the bridge circuit includes a first switching element and a second switching element connected in series, and a third switching element and a fourth switching element connected in series,
both terminals of the first switching element and the second switching element and both terminals of the third switching element and the fourth switching element are connected in parallel to a direct-current power supply,
the clamping circuit includes a fifth switching element and a sixth switching element connected in series and disposed and oriented in opposite directions,
in the first mode, when alternating-current voltage output from the filter circuit is positive, the second switching element and the third switching element are switched off, the sixth switching element is switched on, and (i) the first switching element and the fourth switching element and (ii) the fifth switching element are complementarily switched on and off,
in the first mode, when the alternating-current voltage output from the filter circuit is negative, the first switching element and the fourth switching element are switched off, the fifth switching element is switched on, and (i) the second switching element and the third switching element and (ii) the sixth switching element are complementarily switched on and off, and
in the second mode, the fifth switching element and the sixth switching element are switched off, and (i) the first switching element and the fourth switching element and (ii) the second switching element and the third switching element are complementarily switched on and off.

3. The power conversion system according to claim 1, wherein
each of the plurality of power conversion devices further includes a communication unit for notifying an operating mode of the power conversion device to another one of the plurality of power conversion devices that is operating in parallel.

4. The power conversion system according to claim 3, wherein
the plurality of power conversion devices are started in the second mode, and subsequently one or more of the plurality of power conversion devices switches to the first mode.

5. The power conversion system according to claim 1, further comprising:
a control device that specifies an operating mode for each of the plurality of power conversion devices.

6. The power conversion system according to claim 5, further comprising:
a voltage detection unit configured to detect alternating-current voltage applied to the load supplied with alternating-current power from the power conversion system; and
a zero-crossover distortion measurement unit configured to measure a zero-crossover distortion from the alternating-current voltage detected,
wherein the control device determines a proportion of the plurality of power conversion devices to operate in the second mode according to a magnitude of the zero-crossover distortion measured by the zero-crossover distortion measurement unit.

7. The power conversion system according to claim 1, wherein
among the plurality of power conversion devices, one is a voltage control method power conversion device, and each remaining one is a current control method power conversion device, and
the voltage control method power conversion device operates in the second mode, and each current control method power conversion device operates in the first mode.

8. A power conversion system, comprising:
a first power conversion device; and
a second power conversion device,
wherein the first power conversion device and the second power conversion device each include two alternating-current side output terminals that are connected, and operate in parallel, a single load being connected between the two alternating-current side output terminals of the first power conversion device and the second power conversion device,
the first power conversion device includes:
a first bridge circuit capable of converting an input direct-current voltage and outputting an alternating-current voltage;
a first filter circuit that attenuates a high-frequency component of the alternating-current voltage output by the first bridge circuit; and
a clamping circuit disposed between the first bridge circuit and the first filter circuit, and capable of short-circuiting an output side of the first bridge circuit, the first bridge circuit and the clamping circuit operate to output the alternating-current voltage to the single load through the first filter circuit at three or more voltage levels, and
the second power conversion device includes:
a second bridge circuit capable of converting input direct-current voltage and outputting alternating-current voltage at two voltage levels; and
a second filter circuit that attenuates a high-frequency component of the alternating-current voltage output by the second bridge circuit,
while the first bridge circuit and clamping circuit are operating to output the alternating-current voltage to the single load through the first filter circuit at three or more voltage levels, the second bridge circuit operates to output the alternating-current voltage to the single load through the second filter at two voltage levels.

9. A power conversion device, comprising:
a bridge circuit capable of converting an input direct-current voltage and outputting an alternating-current voltage;
a filter circuit that attenuates a high-frequency component of the alternating-current voltage output by the bridge circuit;
a clamping circuit disposed between the bridge circuit and the filter circuit, and capable of short-circuiting an output side of the bridge circuit; and
a control circuit that controls switching elements included in the bridge circuit and the clamping circuit,
wherein the control circuit:
has a first mode in which the switching elements cause the alternating-current voltage to be output to the filter circuit at three or more voltage levels, and a second mode in which the switching elements cause the alternating-current voltage to be output to the filter circuit at two voltage levels; and
is configured to be capable of switching between the first mode and the second mode
wherein the power conversion device operates in parallel with another power conversion device, and the power conversion device and the another power conversion device each includes two alternating-current side output terminals, a single load being connected between the two alternating-current side output terminals of the power conversion device and the another power conversion device,
while the another power conversion device is operating to output the alternating-current voltage to the single load at three or more voltage levels, the control circuit switches to the second mode to cause the bridge circuit and the clamping circuit to output the alternating-current voltage to the single load through the filter circuit at two voltage levels.

* * * * *